US012541569B2

(12) United States Patent
Brady et al.

(10) Patent No.: US 12,541,569 B2
(45) Date of Patent: Feb. 3, 2026

(54) METHODS AND APPARATUS FOR PERFORMING A MACHINE LEARNING OPERATION USING STORAGE ELEMENT POINTERS

(71) Applicant: Intel Corporation, Santa Clara, CA (US)

(72) Inventors: Kevin Brady, Newry (GB); Martin Power, Dublin (IE); Martin-Thomas Grymel, Leixlip (IE); Alessandro Palla, Pisa (IT); David Bernard, Kilcullen (IE); Niall Hanrahan, Galway (IE)

(73) Assignee: Intel Corporation, Santa Clara, CA (US)

( * ) Notice: Subject to any disclaimer, the term of this patent is extended or adjusted under 35 U.S.C. 154(b) by 991 days.

(21) Appl. No.: 17/554,970

(22) Filed: Dec. 17, 2021

(65) Prior Publication Data

US 2022/0108135 A1    Apr. 7, 2022

(51) Int. Cl.
*G06F 18/214*    (2023.01)
*G06F 18/213*    (2023.01)
*G06N 3/04*    (2023.01)

(52) U.S. Cl.
CPC ........ *G06F 18/2148* (2023.01); *G06F 18/213* (2023.01); *G06N 3/04* (2013.01)

(58) Field of Classification Search
CPC ...... G06F 18/213; G06F 18/2148; G06N 3/04
See application file for complete search history.

(56) References Cited

U.S. PATENT DOCUMENTS

| 10,275,306 B1* | 4/2019 | MacLaren ........... G06F 11/1048 |
| 10,303,543 B1* | 5/2019 | MacLaren ........... G06F 11/3037 |
| 11,526,469 B1* | 12/2022 | Mathews ............ H03M 7/6058 |
| 2008/0168253 A1 | 7/2008 | Garrison |

(Continued)

FOREIGN PATENT DOCUMENTS

WO    2021035397 A1    3/2021

OTHER PUBLICATIONS

Yu et al., "A Data-Center FPGA Acceleration Platform for Convolutional Neural Networks," IEEE, 2019, 8 pgs. (Year: 2019).*

(Continued)

*Primary Examiner* — Eric J. Bycer
(74) *Attorney, Agent, or Firm* — Akona IP PC

(57) ABSTRACT

Methods, apparatus, systems, and articles of manufacture are disclosed for performing a machine learning operation using storage element pointers. An example computer readable medium comprises instructions that when executed, cause at least one processor to select, in response to a determination that a machine learning operation is to be performed, create first and second storage element pointers based on a type of machine learning operation to be performed, remap input tensor data of the input tensor based on the first storage element pointer without movement of the input tensor data in memory, cause execution of the machine learning operation with the remapped input tensor data to create intermediate tensor data, remap the intermediate tensor data based on the second storage element pointer without movement of the intermediate tensor data in memory, and provide the remapped intermediate tensor data as an output tensor.

23 Claims, 20 Drawing Sheets

(56) References Cited

U.S. PATENT DOCUMENTS

| | | | |
|---|---|---|---|
| 2016/0343455 | A1 | 11/2016 | Lesartre et al. |
| 2019/0220704 | A1* | 7/2019 | Schulz-Trieglaff .... G16B 40/00 |
| 2020/0019859 | A1* | 1/2020 | Kyriazopoulou Panagiotopoulou ... G06N 20/20 |
| 2020/0042220 | A1* | 2/2020 | Armangau ............ G06F 3/0604 |
| 2020/0285949 | A1 | 9/2020 | Baum et al. |
| 2021/0064987 | A1* | 3/2021 | Springer .................. G06N 3/08 |
| 2021/0142154 | A1 | 5/2021 | Pang |
| 2021/0181951 | A1 | 6/2021 | Jin |
| 2021/0303155 | A1* | 9/2021 | Meister ................. G06F 3/0608 |
| 2022/0108135 | A1 | 4/2022 | Brady et al. |

OTHER PUBLICATIONS

Aimar et al., "NullHop: A Flexible Convolutional Neural Network Accelerator Based on Sparse Representations of Feature Maps, " IEEE Transactions on Neural Networks and Learning Systems, vol. 30, No. 1, Mar. 2019, pp. 644-656. (Year: 2019).*

Lin et al., "MERIT: Tensor Transform for Memory-Efficient Vision Processing on Parallel Architectures," Nov. 7, 2019, 14 pgs. (Year: 2019).*

Majumder et al., "A Flexible FPGA Accelerator for Convolutional Neural Networks," Dec. 21, 2019, 13 pgs. (Year: 2019).*

Carreras et al., "Optimizing Temporal Convolutional Network Inference on FPGA-Based Accelerators," IEEE Journal on Emerging and Selected Topics in Circuits and Systems, vol. 10, No. 3, Sep. 2019, pp. 348-361. (Year: 2019).*

Srivastava et al., "Tensaurus: A Versatile Accelerator for Mixed Sparse-Dense tensor Computations," 2020 IEEE International Symposium on High Performance Computer Architecture, pp. 689-702. (Year: 2020).*

Abts et al., "Think Fast: A Tensor Streaming Processor (TSP) for Accelerating Deep Learning Workloads," 2020 ACM/IEEE 47th International Symposium on Computer Architecture, pp. 145-158. (Year: 2020).*

Dave et al., "Hardware Acceleration of Sparse and Irregular Tensor Computations of ML Models: A Survey and Insights," IEEE, Jul. 22, 2021, 44 pgs. (Year: 2021).*

International Searching Authority, "Written Opinion of the International Searching Authority," issued in connection with International Patent Application No. PCT/US2022/050301, mailed on Mar. 27, 2023, 4 pages.

International Searching Authority, "International Search Report," issued in connection with International Patent Application No. PCT/US2022/050301, mailed on Mar. 27, 2023, 4 pages.

Zhang et al., "ShuffleNet: An Extremely Efficient Convolutional Neural Network for Mobile Devices," arXiv:1707.01083v2, submitted Jul. 4, 2017, revised Dec. 7, 2017, 9 pages.

Chen et al., "DeepLab: Semantic Image Segmentation with Deep Convolutional Nets, Atrous Convolution, and Fully Connected CRFs," arXiv:1606.00915v2, submitted Jun. 2, 2016, revised May 12, 2017, 14 pages.

Zhao et al., "ICNet for Real-Time Semantic segmentation on High-Resolution Images," arXiv:1704.08545v2, submitted Apr. 27, 2017, revised Aug. 20, 2018, 16 pages.

Kie et al., "Aggregated Residual Transformations for Deep Neural Networks," arXiv:1611.05431v2, submitted Nov. 16, 2016, revised Apr. 11, 2017, 10 pages.

Gao et al., "Res2Net: A New Multi-scale Backbone Architecture," arXiv:1904.01169v3, submited Apr. 2, 2019, revised Jan. 27, 2021, 11 pages.

Wolterink et al., "Dilated Convolutional Neural Networks for Cardiovascular MR Segmentation in Congenital Heart Disease," arXiv:1704.03669v1, submitted Apr. 12, 2017, 9 pages.

Van Den Oord et al., "WaveNet: A Generative Model for Raw Audio," arXiv:1609.03499v2, submitted Sep. 12, 2016, revised Sep. 19, 2016, 15 pages.

Lavasani et al., An FPGA-based In-line Acclertor for Memcached, IEEE Computer Architecture Letters, vol. 13, No. 2, Jul.-Dec. 2014, 4 pages.

\* cited by examiner

METHODS AND APPARATUS FOR PERFORMING A MACHINE LEARNING OPERATION USING STORAGE ELEMENT POINTERS

FIELD OF THE DISCLOSURE

This disclosure relates generally to machine learning and, more particularly, to methods and apparatus for performing a machine learning operation using storage element pointers.

BACKGROUND

There is an ever-increasing number of Neural Network Architectures in use across many domains such as computer vision, speech recognition, image and video processing. As Neural Network Architectures evolve, new types of operations are defined to improve the accuracy or optimize the performance of the Neural Networks. It is a challenge for Neural Compute Engines to have the features required to efficiently support new operations required by evolving Neural Network Architectures.

Figure 1A:
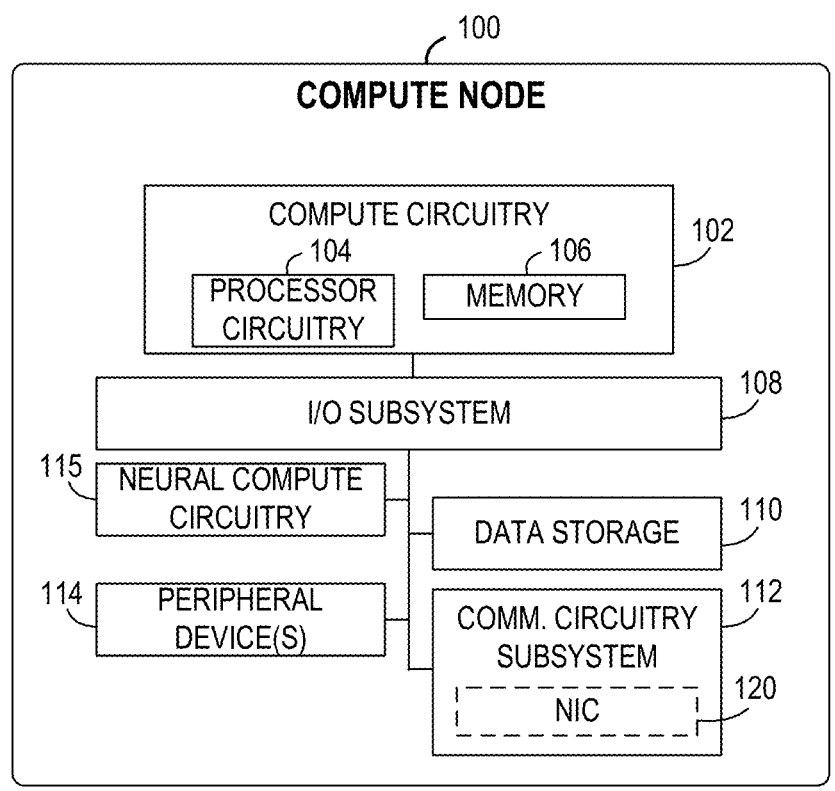
FIG. 1A illustrates an example compute node.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

There is an ever-increasing number of Neural Network Architectures in use across many domains such as computer vision, speech recognition, image processing, and video processing. As Neural Network Architectures evolve, new types of operations are defined to improve the accuracy or optimize the performance of the Neural Networks. It is a challenge for Neural Compute Engines to have the features required to efficiently support such new operations required by evolving Neural Network Architectures.

For instance, two very recent Neural Network Architectures which require new types of convolutions are Shuffle-Net and DeepLab. For example, ShuffleNet introduces Group Convolutions, and DeepLab introduces Dilated/Atrous Convolutions. Examples disclosed herein employ storage element pointers to manipulate a tensor inline (e.g., with zero execution overhead) in such a way that the Neural Compute Engine can implement standard convolutions to realize the Group and Dilated convolutions.

Many different types of neural network operations exist for use during the processing and/or execution of a neural network including, for example, convolution operations. In some examples, hardware, such as Neural Compute Engine may be developed to support execution of a particular set of operations. If the Neural Compute Engine does not natively support a convolution operation, an input tensor can be re-formatted in way that allows the Neural Compute Engine to perform a regular convolution to achieve the desired convolution. Existing approaches achieve such reformatting by way of a direct memory access (DMA) and/or a general-purpose processor.

In some instances, the unsupported operations are off-loaded to different compute circuitry such as, for example, a general-purpose processing units (CPU). Such an approach, albeit at a significant power and performance penalty.

Unfortunately, it is difficult to predict what types of convolution are required in the future as Neural Network Architectures are evolving. Adding features for specific types of convolution can be an endless and/or unpredictable task. Moreover, re-formatting an input tensor, as performed by a DMA engine and/or a general-purpose processor, consumes precious resources in a Neural Compute Engine system. This has a direct impact on the performance of the Neural Compute Engine due to the time taken to do the tensor re-formatting, and also has an indirect impact as the DMA engine and/or processor is diverted from performing other tasks. Example approaches disclosed herein enable inline re-formatting, which does not impact performance and/or require processing time from other agents in the Neural Compute Engine system.

Figure 1B:
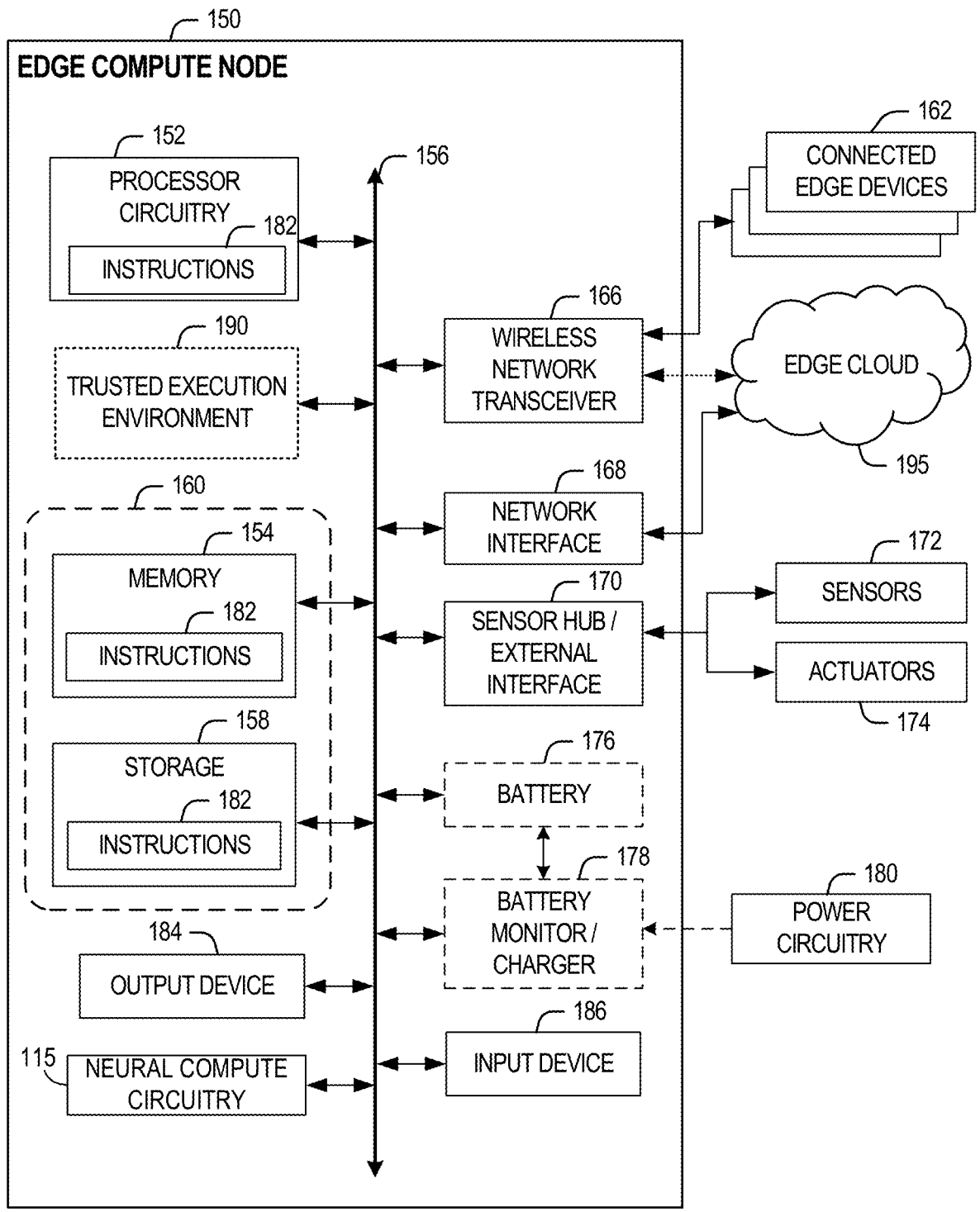
FIG. 1B is a block diagram of an example of an Edge computing node.

In examples disclosed herein, a Neural Compute Engine may be implemented as a component of a compute device and/or node, such as the compute node(s) illustrated in FIGS. 1A and 1B. Such a compute node may, for example, be implemented as a standalone device and/or may work in concert with other compute nodes to perform a computing task. That is, the compute node may be a component of an Edge computing system.

FIG. 1A illustrates an example compute node. Any of the compute nodes or devices discussed with reference to the present Edge computing systems and environment may be fulfilled based on the components depicted in FIGS. 1A and/or 1B. However, other compute nodes including additional and/or alternative components are also contemplated. A node may be implemented by any type of device, appliance, computer, or other electronic device capable of communicating with other electronic devices (e.g., any Edge, networking, or endpoint devices). For example, an Edge compute device may be implemented by any personal computer, server, smartphone, mobile compute device, smart appliance, in-vehicle compute system (e.g., a navigation system), self-contained device having an outer case, shell, etc., and/or other device or system.

In the example depicted in FIG. 1A, the compute node 100 includes a compute engine (also referred to herein as "compute circuitry") 102, an input/output (I/O) subsystem (also referred to herein as "I/O circuitry") 108, data storage (also referred to herein as "data storage circuitry") 110, a communication circuitry subsystem 112, and, one or more peripheral devices (also referred to herein as "peripheral device circuitry") 114. In other examples, respective compute devices may include other, fewer, and/or additional components, such as those typically found in a computer (e.g., a display, a graphics processor, etc.). Additionally, in some examples, one or more of the illustrative components may be eliminated and/or incorporated in, or otherwise form a portion of, another component.

The compute node 100 may be implemented by any type of engine, electronic device, or collection of electronic devices. In some examples, the compute node 100 may be implemented by a single device such as an integrated circuit, an embedded system, a field-programmable gate array (FPGA), a system-on-a-chip (SOC), or other integrated system or device. In the illustrative example, the compute node 100 includes or is implemented by a processor circuitry (also referred to herein as "processor") 104 and a memory (also referred to herein as "memory circuitry") 106. The processor 104 may be implemented by any type of processor(s) (e.g., logic circuitry executing an application). For example, the processor 104 may be implemented by a multi-core processor(s), a microcontroller, a processing unit, a specialized or special purpose processing unit, a Field Programmable Gate Array (FPGA), and/or other logic circuit.

In some examples, the processor 104 may be implemented by an FPGA, an application specific integrated circuit (ASIC), reconfigurable hardware or hardware circuitry, and/or other specialized hardware. Also in some examples, the processor 104 may be implemented by a specialized x-processing unit (xPU), a data processing unit (DPU), an infrastructure processing unit (IPU), or network processing unit (NPU). Such an xPU may be implemented by a standalone circuit or circuit package, integrated within an SOC, or integrated with networking circuitry (e.g., in a SmartNIC, or enhanced SmartNIC), acceleration circuitry, storage hardware, storage disks, or AI hardware (e.g., GPUs (graphics processing units), programmed FPGAs, or ASICs tailored to implement an AI model such as a neural network). Such an xPU may be designed to receive, retrieve, and/or otherwise obtain programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that an xPU, an SOC, a CPU, and other variations of the processor 104 may work in coordination with each other to execute many types of operations and instructions within and on behalf of the compute node 100. In some examples, the AI hardware may be implemented by neural compute circuitry 115.

The memory 106 may be implemented by any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM is synchronous dynamic random access memory (SDRAM). While in the illustrated example of FIG. 1A the memory 106 is shown as a component of the compute circuitry 102, in some examples, additional memories may be accessible to the compute circuitry 102 via, for example a bus. In some examples, the additional memories (e.g., memory circuitries) may be included in other devices such as in, for example, the neural compute circuitry 115, the peripheral device(s) 114, the communication circuitry subsystem 112, etc. Such additional memories may be directly and/or indirectly accessible to the compute circuitry 102. Alternatively, such additional memories may be local to the other devices (e.g., the neural compute circuitry 115) and/or at other locations (e.g., nodes) accessible via a network.

In some examples, the memory 106 (e.g., memory circuitry) is implemented by any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory 106 includes a byte-addressable write-in-place three dimensional crosspoint memory device, and/or other byte addressable write-in-place non-volatile memory (NVM) devices, such as single or multi-level Phase Change Memory (PCM) and/or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. Memory 106 may also include a three-dimensional crosspoint memory device (e.g., Intel® 3D XPoint™ memory), and/or other byte addressable write-in-place nonvolatile memory devices. The memory may refer to the die itself and/or to a packaged memory product. In some examples, 3D crosspoint memory (e.g., Intel® 3D XPoint™ memory) may include a transistor-less stackable cross point architecture in which memory cells sit at the intersection of word lines and bit lines and are individually addressable and in which bit storage is based on a change in bulk resistance. In some examples, all or a portion of the memory 106 may be integrated into the processor circuitry 104. The memory 106 may store various software and/or data used during operation such as one or more applications, data operated on by the application(s), libraries, and/or drivers.

In some examples, resistor-based and/or transistor-less memory architectures include nanometer scale phase-change memory (PCM) devices in which a volume of phase-change material resides between at least two electrodes. Portions of the example phase-change material exhibit degrees of crystalline phases and/or amorphous phases, in which different degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0", set to logical "1", set to an intermediary resistance value) are accomplished by applying one or more current pulses to the at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann compute architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann compute architectures. However, PCM devices reduce (e.g., minimize) and, in some cases, eliminate data transfers between the CPU and memory by performing some computing operations in-memory. Stated differently, PCM devices both store information and execute computational tasks. Such non-von Neumann compute architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 102 is communicatively coupled to other components of the compute node 100 via the I/O subsystem 108, which may be implemented by circuitry and/or components to facilitate input/output operations with the compute circuitry 102 (e.g., with the processor 104 and/or the memory 106) and other components of the compute circuitry 102. For example, the I/O subsystem 108 may be implemented by, or otherwise include, memory controller hubs, input/output control hubs, integrated sensor hubs, firmware devices, communication links (e.g., point-to-point links, bus links, wires, cables, light guides, printed circuit board traces, etc.), and/or other components and/or subsystems to facilitate the input/output operations. In some examples, the I/O subsystem 108 may form a portion of a system-on-a-chip (SoC) and be incorporated, along with one or more of the processor circuitry 104, the memory 106, and other components of the compute circuitry 102, into the compute circuitry 102.

The one or more illustrative data storage devices/disks 110 may be implemented by one or more of any type(s) of physical device(s) configured for short-term or long-term storage of data such as, for example, memory devices, memory, circuitry, memory cards, flash memory, hard disk drives (HDDs), solid-state drives (SSDs), and/or other data storage devices/disks. Individual data storage devices/disks 110 may include a system partition that stores data and firmware code for the data storage device/disk 110. Individual data storage devices/disks 110 may also include one or more operating system partitions that store data files and executables for operating systems depending on, for example, the type of compute node 100.

The communication circuitry 112 may be implemented by any communication circuit, device, or collection thereof, capable of enabling communication over a network between the compute circuitry 102 and another compute device (e.g., an Edge gateway and/or a node). The communication circuitry 112 may employ any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth® Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 112 includes a network interface controller (NIC) 120, which may also be referred to as a host fabric interface (HFI). The NIC 120 may be implemented by one or more add-in-boards, daughter cards, network interface cards, controller chips, chipsets, and/or other devices. In some examples, the NIC 120 may be part of a system-on-a-chip (SoC) that includes one or more processors, or included on a multichip package that also contains one or more processors. In some examples, the NIC 120 may include a local processor and/or a local memory that are both local to the NIC 120. In such examples, the local processor of the NIC 120 may be capable of performing one or more of the functions of the compute circuitry 102 described herein. Additionally, or alternatively, in such examples, the local memory of the NIC 120 may be integrated into one or more components of the client compute node at the board level, socket level, chip level, and/or other levels.

Additionally, in some examples, a respective compute node 100 may include one or more peripheral devices 114. Such peripheral devices 114 may include any type of peripheral device found in a compute device or server such as audio input devices, a display, other input/output devices, interface devices, and/or other peripheral devices, depending on the particular type of the compute node 100. In further examples, the compute node 100 may be embodied by a respective Edge compute node (whether a client, gateway, or aggregation node) in an Edge computing system or other forms of appliances, computers, subsystems, circuitry, or other components.

FIG. 1B is a block diagram of an example Edge computing node 150. This Edge computing node 150 may be part of a compute device (e.g., a mobile device, a base station, a server, a gateway, etc.). The Edge computing node 150 may include any combination of the hardware or logical components referenced herein, and it may include or couple with any device in an Edge communication network and/or in a combination of networks (e.g., Edge and/or otherwise). The components may be implemented as integrated circuits (ICs), portions thereof, discrete electronic devices, and/or other circuits, instruction sets, programmable logic, algorithms, hardware, hardware accelerators, software, firmware, and/or a combination thereof in the Edge computing node 150, or in components otherwise incorporated within a chassis of a larger system.

The Edge computing device 150 of FIG. 1B may include processor circuitry 152, which may be implemented as a microprocessor, a multi-core processor, a multithreaded processor, an ultra-low voltage processor, an embedded processor, an xPU/DPU/IPU/NPU, special purpose processing unit, specialized processing unit, or other logic circuitry. The processor 152 may be a part of a system on a chip (SoC) in which the processor 152 and other components are formed into a single integrated circuit, or a single package, such as the Edison™ or Galileo™ SoC boards from Intel Corporation, Santa Clara, California. As an example, the processor 152 may include an Intel® Architecture Core™ based CPU processor, such as a Quark™, an Atom™, an i3, an i5, an i7, an i9, or an MCU-class processor, or another such processor available from Intel®. However, any number of additional and/or alternative processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 152 and accompanying circuitry may be provided in a single socket form factor, multiple socket form factor, or a variety of other formats, including in limited hardware configurations or configurations that include fewer than all elements shown in FIG. 1B.

The processor 152 may communicate with a system memory 154 over an interconnect 156 (e.g., a bus). Any number of memory devices may be used to provide a given amount of system memory. As examples, the memory 154 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, the memory and/or a portion thereof may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including, but not limited to, microDIMMs or MiniDIMMs.

To provide for persistent storage of information such as data, applications, operating systems and so forth, a storage 158 may also couple to the processor 152 via the interconnect 156. In an example, the storage 158 may be implemented via a solid-state disk drive (SSDD). Other hardware devices that may be used for the storage 158 include flash memory cards, such as Secure Digital (SD) cards, microSD cards, eXtreme Digital (XD) picture cards, and the like, and/or Universal Serial Bus (USB) flash drives. In some examples, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage hardware circuitry 158 may be implemented by on-die memory or registers associated with the processor 152. However, in some examples, the storage hardware 158 may be implemented using a micro hard disk drive (HDD). Further, any number of new technologies may be used for the storage hardware 158 in addition to, or instead of, the technologies described, such as resistance change memories, phase change memories, holographic memories, or chemical memories, among others.

The components of the example node of FIG. 1B may communicate over the interconnect 156. The interconnect 156 may include any number of technologies, including industry standard architecture (ISA), extended ISA (EISA), peripheral component interconnect (PCI), peripheral component interconnect extended (PCIx), PCI express (PCIe), and/or any number of other technologies. The interconnect 156 may be a proprietary bus, for example, used in an SoC based system. Other bus systems may be included, such as an Inter-Integrated Circuit (I2C) interface, a Serial Peripheral Interface (SPI) interface, point to point interfaces, and/or a power bus, among others.

The interconnect 156 may couple the processor 152 to a transceiver 166, for communications with networked devices such as the connected Edge devices 162. The transceiver 166 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected Edge devices 162. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular and/or other wireless wide area protocol, may occur via a wireless wide area network (WWAN) unit.

The wireless network transceiver 166 (or multiple transceivers) may communicate using multiple standards and/or radios for communications at a different range. For example, the Edge computing node 150 may communicate with close devices, e.g., within about 10 meters, using a local transceiver based on Bluetooth® Low Energy (BLE), and/or another low power radio, to save power. More distant connected Edge devices 162, e.g., within about 50 meters, may be reached over ZigBee® and/or other intermediate power radios. Both communications techniques may take place over a single radio at different power levels or may take place over separate transceivers, for example, a local transceiver using BLE and a separate mesh transceiver using ZigBee®.

A wireless network transceiver 166 (e.g., a radio transceiver) may be included to communicate with devices and/or services in a cloud (e.g., an Edge cloud 195) via local and/or wide area network protocols. The wireless network transceiver 166 may be a low-power wide-area (LPWA) transceiver that follows the IEEE 802.15.4, and/or IEEE 802.15.4g standards, among others. The Edge computing node 150 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and/or protocols may be used in addition to the systems mentioned for the wireless network transceiver 166, as described herein. For example, the transceiver 166 may include a cellular transceiver that uses spread spectrum (SPA/SAS) communications for implementing high-speed communications. Further, any number of other protocols may be used, such as Wi-Fi® networks for medium speed communications and/or provision of network communications. The transceiver 166 may include radios that are compatible with any number of 3GPP (Third Generation Partnership Project) specifications, such as Long Term Evolution (LTE) and 5th Generation (5G) communication systems. A network interface controller (NIC) 168 may be included to provide wired communication with nodes of the Edge cloud 195 or with other devices, such as the connected Edge devices 162 (e.g., operating in a mesh). The wired communication may provide an Ethernet connection and/or may be based on other types of networks, such as Controller Area Network (CAN), Local Interconnect Network (LIN), DeviceNet, ControlNet, Data Highway+, PROFIBUS, or PROFINET, etc. An additional MC 168 may be included to enable connecting to a second network such as, for example, a first MC 168 providing communications with the cloud over Ethernet, and a second NIC 168 providing communications with other devices over another type of network.

Given the variety of types of applicable communications from the device to another component and/or network, applicable communications circuitry used by the device may include any one or more of components 166, 168, or 170. Accordingly, in different examples, applicable means for communicating (e.g., receiving, transmitting, etc.) may be implemented by such communications circuitry.

The interconnect 156 may couple the processor 152 to a sensor hub and/or external interface 170 that is used to connect additional devices and/or subsystems. The devices may include sensors 172, such as accelerometers, level sensors, flow sensors, optical light sensors, camera sensors, temperature sensors, global navigation system (e.g., GPS) sensors, pressure sensors, barometric pressure sensors, and/or the like. The hub or interface 170 further may communicatively connect the Edge computing node 150 with actuators 174, such as power switches, valve actuators, an audible sound generator, a visual warning device, and/or the like.

In some examples, various input/output (I/O) devices may be present within and/or connected to, the Edge computing node 150. For example, a display and/or other output device 184 may be included to show information, such as sensor readings and/or actuator position. An input device 186, such as a touch screen or keypad may be included to accept input. An output device 184 may include any number of forms of audio or visual display, including simple visual outputs such as binary status indicators (e.g., light-emitting diodes (LEDs)) and multi-character visual outputs, and/or more complex outputs such as display screens (e.g., liquid crystal display (LCD) screens), with the output of characters, graphics, multimedia objects, and/or the like being generated or produced from the operation of the Edge computing node 150. A display and/or console hardware may be used to provide output and/or receive input; to manage components and/or services; identify a state of a component and/or service; and/or to conduct any other number of management and/or administration functions and/or service cases.

The Edge computing node 150 may include and/or be coupled to the neural compute circuitry 115, to implement one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, and/or other forms of specialized processors and/or circuitry designed to accomplish one or more specialized tasks. These tasks may include AI processing (including machine learning, training, inferencing, and classification operations), visual data processing, network data processing, object detection, rule analysis, or the like. These tasks also may include specific Edge computing tasks for service management and service operations.

In some examples, the bus 156 enables the processor 152 to communicate and/or interface with the neural compute circuitry 115. In some examples, the neural compute circuitry 115 may be referred to as an accelerator (e.g., an AI accelerator). The neural compute circuitry 115 enables offloading of artificial intelligence and/or machine learning tasks from the processor 152 to the neural compute circuitry 115. In other words, the neural compute circuitry 115 represents special purpose circuitry that is designed for handling of machine learning and/or artificial intelligence related tasks, such as execution of a machine learning model based on input data (e.g., provided by the processor 152 to the neural compute circuitry 115) to create output data (e.g., provided by the neural compute circuitry 115 to the processor 152). Not only can the neural compute circuitry typically perform such machine learning and/or artificial intelligence related tasks more efficiently than the processor 152, but execution of such machine learning and/or artificial intelligence related tasks by the neural compute circuitry 115 enables the processor 152 to attend to other tasks which might have been delayed had the operation of the neural compute circuitry 115 been performed by the processor circuitry 150.

A battery 176 may power the Edge computing node 150, although, in examples in which the Edge computing node 150 is mounted in a fixed location, it may have a power supply coupled to an electrical grid, and/or the battery may be used as a backup and/or for temporary capabilities. The battery 176 may be a lithium ion battery, and/or a metal-air battery, such as a zinc-air battery, an aluminum-air battery, a lithium-air battery, and/or the like.

A battery monitor/charger 178 may be included in the Edge computing node 150 to track the state of charge (SoCh) of the battery 176. The battery monitor/charger 178 may be used to monitor other parameters of the battery 176 to provide failure predictions, such as the state of health (SoH) and the state of function (SoF) of the battery 176. The battery monitor/charger 178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 178 may communicate the information on the battery 176 to the processor 152 over the interconnect 156. The battery monitor/charger 178 may also include an analog-to-digital (ADC) converter that enables the processor 152 to directly monitor the voltage of the battery 176 and/or the current flow from the battery 176. The battery parameters may be used to determine actions that the Edge computing node 150 may perform, such as transmission frequency, mesh network operation, sensing frequency, and/or the like.

A power circuit 180, and/or other power supply coupled to a grid, may be coupled with the battery monitor/charger 178 to charge the battery 176. In some examples, the power circuit 180 may be replaced with a wireless power receiver to obtain the power wirelessly, for example, through a loop antenna in the Edge computing node 150. A wireless battery charging circuit, such as an LTC4020 chip from Linear Technologies of Milpitas, California, among others, may be included in the battery monitor/charger 178. The specific charging circuits may be selected based on the size of the battery 176, and thus, the current required. Charging may be performed using the Airfuel standard promulgated by the Airfuel Alliance, the Qi wireless charging standard promulgated by the Wireless Power Consortium, and/or the Rezence charging standard, promulgated by the Alliance for Wireless Power, among others.

The storage circuit 158 may include instructions 182 in the form of software, firmware, or hardware commands to implement the techniques described herein. Although such instructions 182 are shown as code blocks included in the memory 154 and the storage 158, it should be understood that any of the code blocks may be replaced with hardwired circuits, for example, built into an application specific integrated circuit (ASIC), implemented by an FPGA, etc.

In some examples, the instructions 182 provided via the memory 154, the storage 158, and/or the processor 152 may be implemented by a non-transitory, machine-readable medium 160 including code to direct the processor 152 to perform electronic operations in the Edge computing node 150. The processor 152 may access the non-transitory, machine-readable medium 160 over the interconnect 156. For instance, the non-transitory, machine-readable medium 160 may be embodied by devices described for the storage 158 and/or may include specific storage units such as storage devices and/or storage disks that include optical disks (e.g., digital versatile disk (DVD), compact disk (CD), CD-ROM, Blu-rayIM disk), flash drives, floppy disks, hard drives (e.g., SSDs), and/or any number of other hardware devices in which information is stored for any duration (e.g., for extended time periods, permanently, for brief instances, for temporarily buffering, and/or caching). The non-transitory, machine-readable medium 160 may include instructions to direct the processor 152 to perform a specific sequence and/or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Also in a specific example, the instructions 182 on the processor 152 (separately, and/or in combination with the instructions 182 of the machine readable medium 160) may configure execution or operation of a trusted execution environment (TEE) 190. In an example, the TEE 190 operates as a protected area accessible to the processor 152 for secure execution of instructions and secure access to data. Various implementations of the TEE 190, and an accompanying secure area in the processor 152 and/or the memory 154 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted and/or protected operations may be implemented in the device 150 through the TEE 190 and the processor 152.

While the illustrated examples of FIG. 1A and FIG. 1B include example components for a compute node and a computing device, respectively, examples disclosed herein are not limited thereto. As used herein, a "computer" may include some and/or all of the example components of FIGS. 1A and/or 1B in different types of computing environments. Example computing environments include Edge computing devices (e.g., Edge computers) in a distributed networking arrangement such that particular ones of participating Edge computing devices are heterogenous or homogeneous devices. As used herein, a "computer" may include a personal computer, a server, user equipment, an accelerator, etc., including any combinations thereof. In some examples, distributed networking and/or distributed computing includes any number of such Edge computing devices as illustrated in FIGS. 1A and/or 1B, each of which may include different sub-components, different memory capacities, I/O capabilities, etc. For example, because some implementations of distributed networking and/or distributed computing are associated with particular desired functionality, examples disclosed herein include different combinations of components illustrated in FIGS. 1A and/or 1B to satisfy functional objectives of distributed computing tasks. In some examples, the term "compute node" or "computer" only includes the example processor 104, memory 106 and I/O subsystem 108 of FIG. 1A. In some examples, one or more objective functions of a distributed computing task(s) rely on one or more alternate devices/structure located in different parts of an Edge networking environment, such as devices to accommodate data storage (e.g., the example data storage 110), input/output capabilities (e.g., the example peripheral device(s) 114), and/or network communication capabilities (e.g., the example NIC 120).

In some examples, computers operate in a distributed computing and/or distributed networking environment (e.g., an Edge network) and are structured to accommodate particular objective functionality in a manner that reduces computational waste. For instance, because a computer includes some or all of the components disclosed in FIGS. 1A and 1B, such computers satisfy execution of distributed computing objective functions without including compute structure that would otherwise be unused and/or underutilized. As such, the term "computer" as used herein includes any combination of structure of FIGS. 1A and/or 1B that is capable of satisfying and/or otherwise executing objective functions of distributed computing tasks. In some examples, computers are structured to be commensurate to corresponding distributed computing objective functions in a manner that downscales or upscales in connection with dynamic demand. In some examples, different computers are invoked and/or otherwise instantiated in view of their ability to process one or more tasks of the distributed computing request(s), such that any computer capable of satisfying the tasks proceed with such computing activity.

In the illustrated examples of FIGS. 1A and 1B, the compute devices include operating systems. As used herein, an "operating system" is software to control the example compute device, such as the example compute node 100 of FIG. 1A and/or the example Edge compute node 150 of FIG. 1B. Example operating systems include, but are not limited to consumer-based operating systems (e.g., Microsoft® Windows® 10, Google® Android® OS, Apple® Mac® OS, etc.). Example operating systems also include, but are not limited to industry-focused operating systems, such as real-time operating systems, hypervisors, etc. An example operating system on a first Edge compute node may be the same or different than an example operating system on a second Edge compute node. In some examples, the operating system invokes alternate software to facilitate one or more functions and/or operations that are not native to the operating system, such as particular communication protocols and/or interpreters. In some examples, the operating system instantiates various functionalities that are not native to the operating system. In some examples, operating systems include varying degrees of complexity and/or capabilities. For instance, a first operating system corresponding to a first Edge compute node includes a real-time operating system having particular performance expectations of responsivity to dynamic input conditions, and a second operating system corresponding to a second Edge compute node includes graphical user interface capabilities to facilitate end-user I/O.

Figure 2:
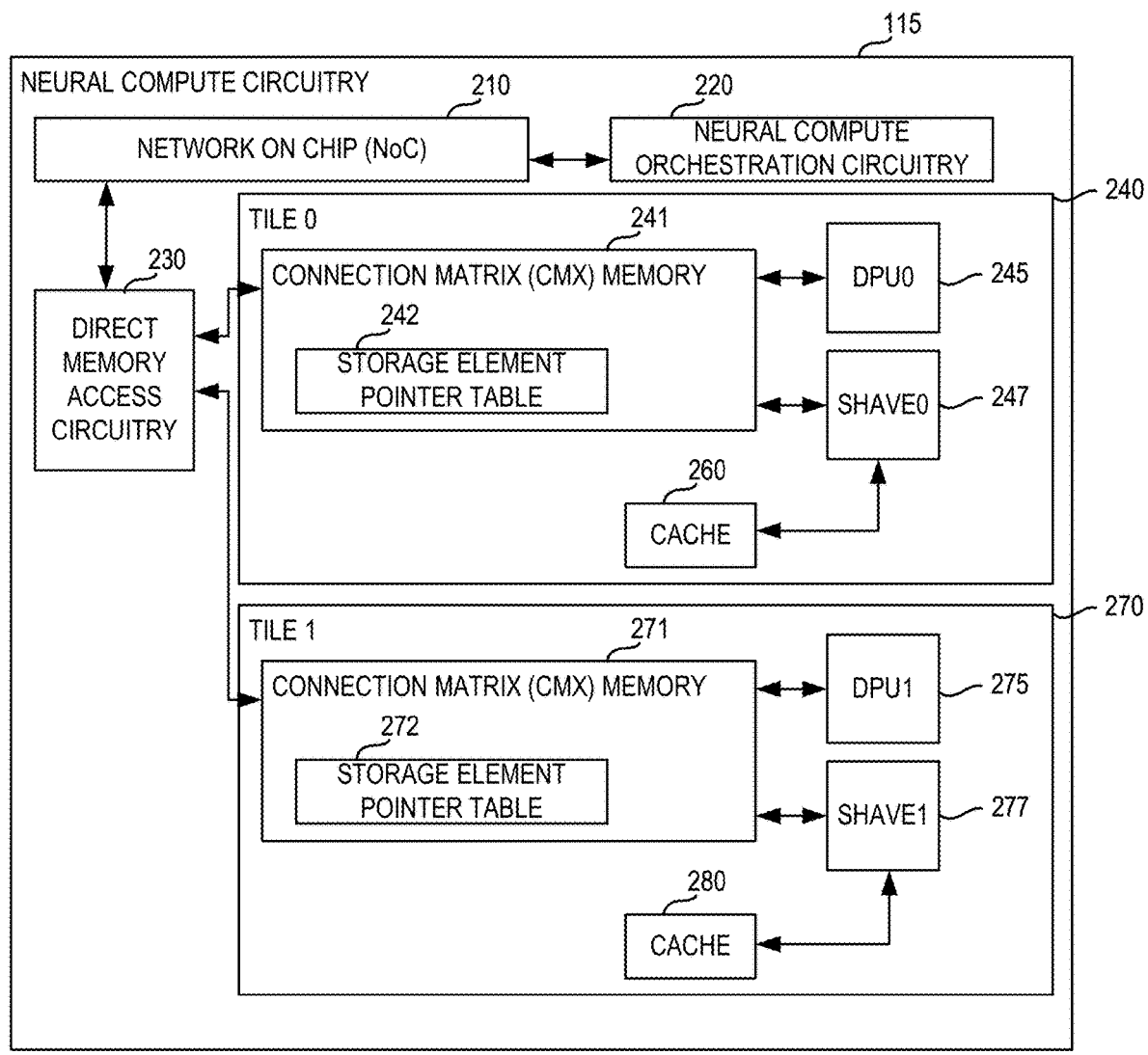
FIG. 2 is a block diagram of an example implementation of the neural compute circuitry of FIG. 1 to execute neural compute tasks.

FIG. 2 is a block diagram of an example implementation of the neural compute circuitry 115 of FIG. 1 to execute neural compute tasks. The neural compute circuitry 115 of FIG. 2 may be instantiated (e.g., creating an instance of, bring into being for any length of time, materialize, implement, etc.) by processor circuitry such as a central processing unit executing instructions. Additionally or alternatively, the neural compute circuitry 115 of FIG. 2 may be instantiated (e.g., creating an instance of, bring into being for any length of time, materialize, implement, etc.) by an ASIC or an FPGA structured to perform operations corresponding to the instructions. It should be understood that some and/or all of the circuitry of FIG. 2 may, thus, be instantiated at the same or different times. Some and/or all of the circuitry may be instantiated, for example, in one or more threads executing concurrently on hardware and/or in series on hardware. Moreover, in some examples, some and/or all of the circuitry of FIG. 2 may be implemented by one or more virtual machines and/or containers executing on the microprocessor.

The example neural compute circuitry 115 of the illustrated example of FIG. 2 includes network on chip (NoC) circuitry 210, neural compute orchestration circuitry 220, direct memory access circuitry 230, a first tile 240, and a second tile 270. The first tile 240 includes a first connection matrix (CMX) memory 241, a first Data Processing Unit (DPU) 245, a first streaming hybrid architecture vector engine (SHAVE) 247, and a cache 260. The second tile 270 includes a second CMX memory 271, a second DPU 275, a second SHAVE 277, and a cache 280. The example CMX memories 241, 271 include respective storage element pointer tables 242, 272.

The example NoC circuitry 210 of the illustrated example of FIG. 2 provides an interface by which other components of a compute node (e.g., the compute node 100 of FIG. 1A) may request performance of a machine learning operation. In examples disclosed herein, the example NoC circuitry 210 communicates via a protocol supported by the interconnect 156 of FIG. 1B. However, any communication protocol that enables a request for performance of a machine learning operation to be communicated, and/or that enables a response to the request to be communicated, may additionally or alternatively be used. Upon receipt of a request, the example NoC circuitry 210 stores tensor data that is to be operated upon in the CMX memory 240. Upon completion of the requested machine learning operation, the example NoC circuitry 210 provides an output tensor to the requestor.

In some examples, the neural compute circuitry 115 includes means for outputting tensor data. For example, the means for outputting may be implemented by the NoC circuitry 210. In some examples, the NoC circuitry 210 may be instantiated by processor circuitry such as the example processor circuitry 1212 of FIG. 12. For instance, the NoC circuitry 210 may be instantiated by the example general purpose processor circuitry 1300 of FIG. 13 executing machine executable instructions. In some examples, the NoC circuitry 210 may be instantiated by hardware logic circuitry, which may be implemented by an ASIC or the FPGA circuitry 1400 of FIG. 14 structured to perform operations corresponding to the machine readable instructions. Additionally or alternatively, the NoC circuitry 210 may be instantiated by any other combination of hardware, software, and/or firmware. For example, the NoC circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example neural compute orchestration circuitry 220 of the illustrated example of FIG. 2 identifies a type of machine learning operation to be performed based on a request received by the NoC circuitry 210. In some examples, the neural compute orchestration circuitry 220 may be referred to as a compiler. The neural compute orchestration circuitry 220 determines whether the machine learning operation requires remapping of tensor data. In examples disclosed herein, the determination of whether the machine learning operation requires remapping of tensor data is based on the type of machine learning operation to be performed. For example, group convolution and dilated convolution operations may be identified as types of machine learning operations that require remapping of tensor data. However, any other type of machine learning operation that utilizes remapping of data may additionally or alternatively be used. If remapping of data is required for performance of the machine learning operation, the neural compute orchestration circuitry 220 determines whether storage element pointers are applicable for the type of machine learning operation. Use of storage element pointers may be applicable, for example, when the neural compute orchestration circuitry 220 causes the DPUs 245, 275 to perform the machine learning operation (e.g., a convolution), potentially using tensor values that are re-mapped by way of the storage element pointers.

In some examples, the neural compute circuitry 115 includes means for orchestrating. For example, the means for orchestrating may be implemented by the neural compute orchestration circuitry 220. In some examples, the neural compute orchestration circuitry 220 may be instantiated by processor circuitry such as the example processor circuitry 1212 of FIG. 12. For instance, the neural compute orchestration circuitry 220 may be instantiated by the example general purpose processor circuitry 1300 of FIG. 13 executing machine executable instructions such as that implemented by at least blocks 1160, 1180 of FIG. 11. In some examples, the neural compute orchestration circuitry 220 may be instantiated by hardware logic circuitry, which may be implemented by an ASIC or the FPGA circuitry 1400 of FIG. 14 structured to perform operations corresponding to the machine readable instructions. Additionally or alternatively, the neural compute orchestration circuitry 220 may be instantiated by any other combination of hardware, software, and/or firmware. For example, the neural compute orchestration circuitry 220 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example DMA circuitry 230 of the illustrated example of FIG. 2 supports transfer of activations, weights, workload descriptors, sparsity tables, the storage element pointer table, and other control information to and from external system memory. The DMA circuitry 230 interfaces to the rest of the Soc through the NoC (Network On Chip) 210.

In some examples, the neural compute circuitry 115 includes means for mapping. For example, the means for mapping may be implemented by the DMA circuitry 230. In some examples, the DMA circuitry 230 may be instantiated by processor circuitry such as the example processor circuitry 1212 of FIG. 12. For instance, the DMA circuitry 230 may be instantiated by the example general purpose processor circuitry 1300 of FIG. 13 executing machine executable instructions such as that implemented by at least blocks 1170, 1190 of FIG. 11. In some examples, the DMA circuitry 230 may be instantiated by hardware logic circuitry, which may be implemented by an ASIC or the FPGA circuitry 1400 of FIG. 14 structured to perform operations corresponding to the machine readable instructions. Additionally or alternatively, the DMA circuitry 230 may be instantiated by any other combination of hardware, software, and/or firmware.

For example, the DMA circuitry 230 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example CMX memory 240 of the illustrated example of FIG. 2 includes the storage element pointer table 242. The CMX memory 240 stores activations, weights, weight control information, activation sparsity information, weight sparsity information, and/or any other information for performing a convolution operation according to the teachings of this disclosure. The example storage element pointer table 242 is a table of storage element pointers that enable re-arrangement of tensor data without having to move elements and/or data in memory.

The example first and second DPUs 245, 275 of the illustrated example of FIG. 2 include multiply and accumulate (MAC) arrays for the Neural Compute Engine. The DPUs 245, 275 are configured (e.g., optimized) for doing high performance, low power convolutions. The example first and second SHAVEs 247, 277 of the illustrated example of FIG. 2 support custom activation functions and can also be used to run certain machine learning operations in place of the DPU 245, 275. The Activation SHAVE cores are more flexible in function but cost more power and give less performance than the DPUs. The SHAVE cores 247, 277 have access to the cache 260, 280 of the corresponding tile. Both the Activation SHAVEs 247, 277 and DPUs 245, 275 share the respective on-chip CMX memory 241, 271.

Figure 3:
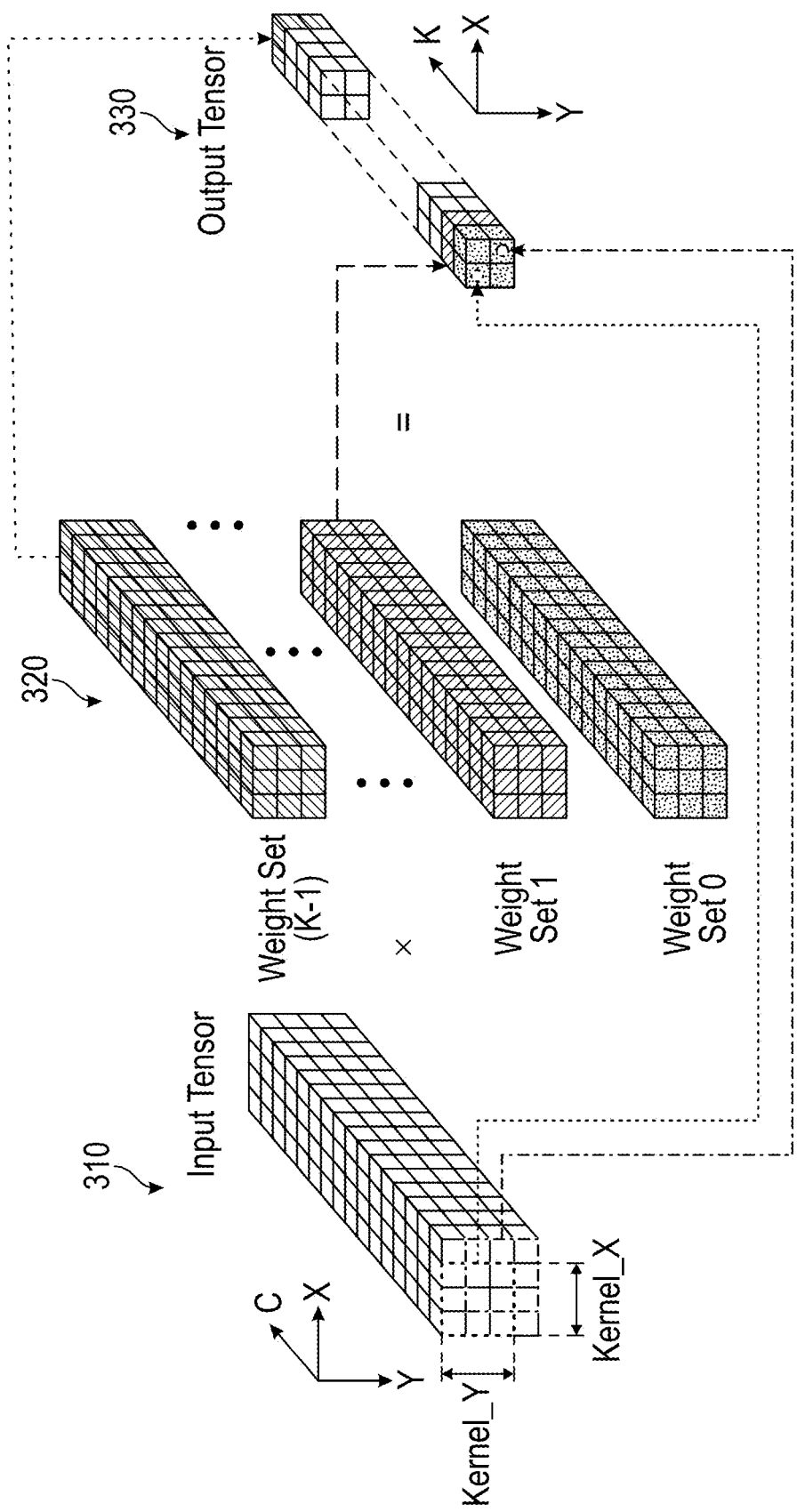
FIG. 3 is a block diagram illustrating behavior of a standard convolution operation.

FIG. 3 is a block diagram illustrating how a standard convolution operation is performed. In examples disclosed herein, data is represented using a tensor. Tensor data can be viewed as a 3-dimensional structure (as illustrated in FIG. 3). The data is stored in memory in a ZXY format, sometimes referred to as a Z major format, meaning data in memory is stored in the Z dimension, followed by the X dimension, followed by the Y dimension. Storage Element Pointers provide one or more pointers per XY location. Such Storage Element Pointers allow the data to be manipulated without moving the data by simply re-arranging the Storage Element Pointers.

By manipulating the Storage Element Pointers, the data can be presented to the Neural Compute Engine in such a way that the neural compute circuitry 115 can perform both Dilated and Group convolutions as standard convolutions. In examples disclosed herein, manipulation of storage element pointers can be done at compile time, so unlike the "reformat" option used by existing approaches for performing Dilated and/or Group convolutions, the usage of storage element pointers does not impact the run-time performance of the neural computer circuitry 115.

In the illustrated example of FIG. 3, an input tensor 310 of dimensions [ix,iy,ic] is convolved with K weight sets 320 of dimensions [kx,ky,ic] to generate an output tensor 330 of dimensions [ox,oy,ok]. Each output point is generated by multiplying and accumulating [kx*ky*ic] pairs of activations and weights.

As noted above, the input and output tensors are stored in memory in Z major or ZYX format. For 8-bit data, an example memory layout is as follows: Tensor position X0Y0Z0 is at byte 0, Tensor position X0Y0Z1 is at byte 1, . . . , Tensor position X1Y0Z0 is at byte [Z], Tensor position X1Y0Z1 is at byte [Z+1].

The neural compute circuitry 115 identifies a single start address for the tensor (e.g., position X0Y0Z0) from which the memory location of any activation in the tensor can be identified. The neural compute circuitry 115 processes the input tensor by reading all the elements in Z before moving onto the next XY location. In other words, the neural compute engine processes multiple XY locations in parallel, before moving on to the next set of XY locations.

Figure 4:
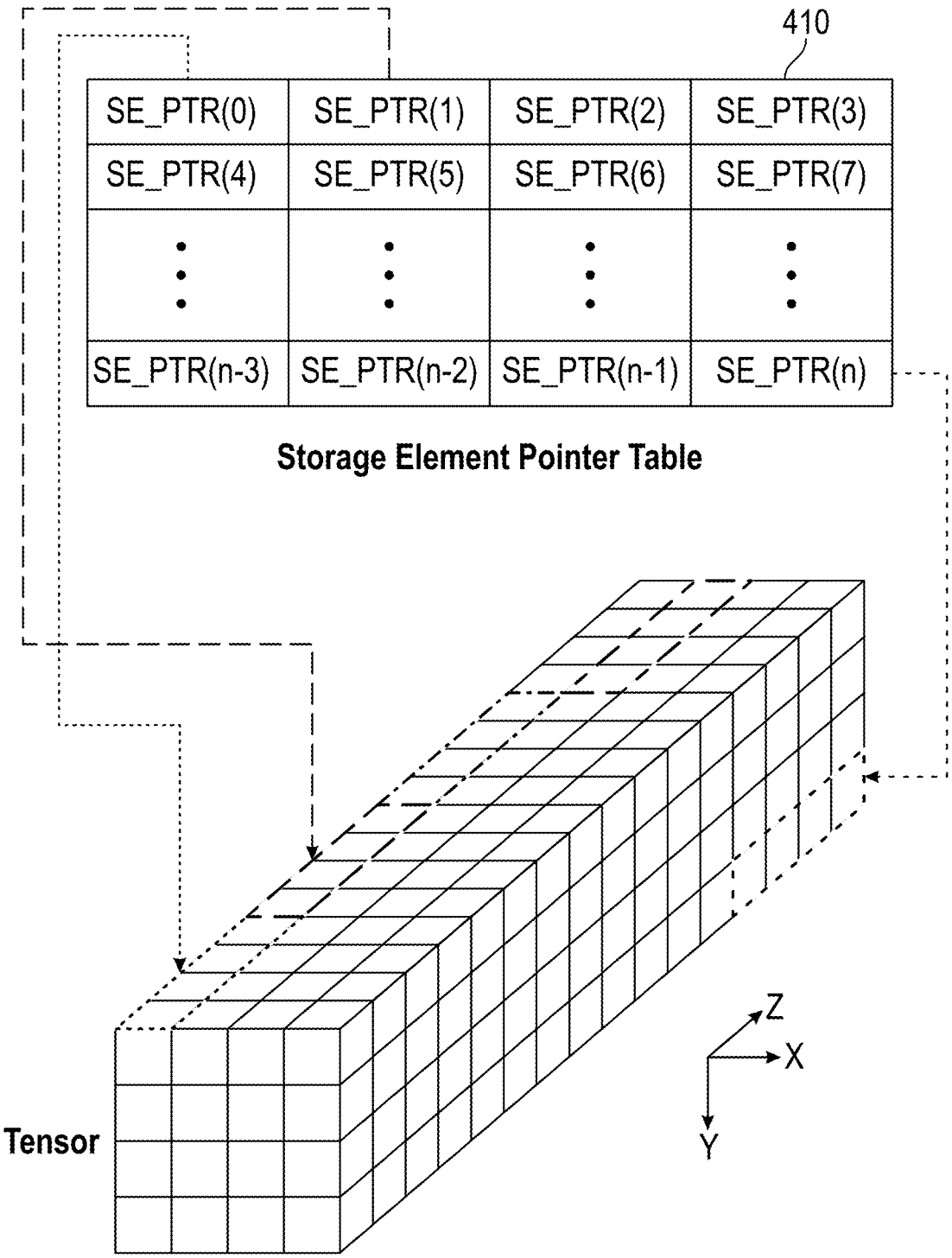
FIG. 4 is a diagram illustrating an example storage element pointer table that may be stored in the CMX memory of FIG. 2.

FIG. 4 is a diagram illustrating an example storage element pointer table 410 that may be stored in the CMX memory of FIG. 2. The storage element pointer table 410 allows the tensor to be stored non-contiguously in memory. Each pointer in the table 410 points to a storage element which contains a block of data within the tensor. The storage element size is configurable per operation or workload. Using as large a storage element size as possible reduces the overhead with storing and processing the pointer table (e.g., by reducing quantities of memory accesses). By manipulating the contents of the storage element pointer table, it is possible to re-arrange how the neural compute circuitry 115 processes the tensor. In examples disclosed herein, the storage element pointer table 410 is pre-compiled, so that the tensor can effectively be re-formatted at a compile stage. As such, there is no time taken to re-format the tensor at run-time. In other words, use of the storage element pointer table 410 enables increased performance compared to approaches that re-format the tensor at run-time.

Figure 5:
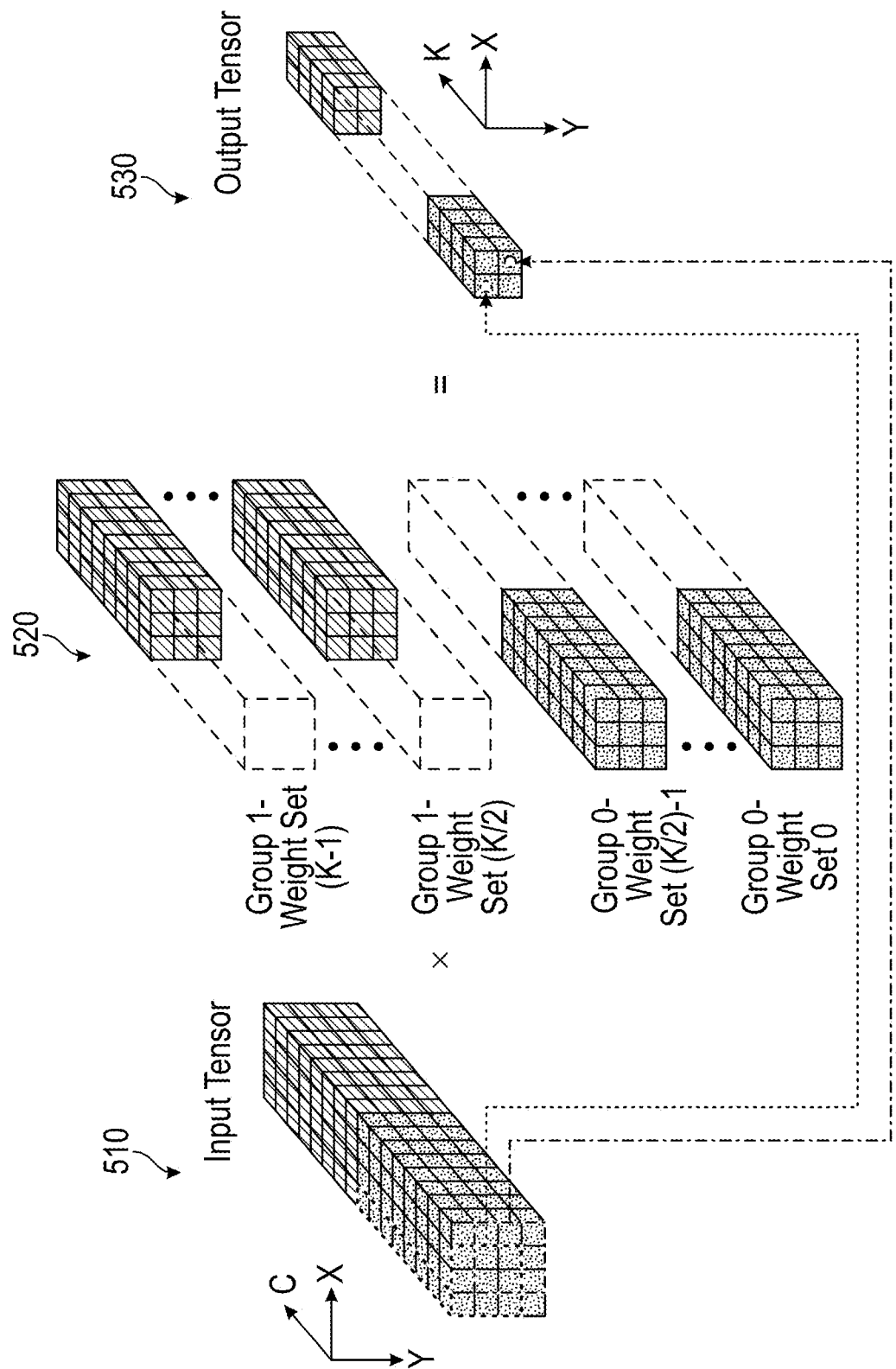
FIG. 5 is a diagram illustrating an example group convolution.

FIG. 5 is a diagram illustrating an example group convolution. As used herein, group convolution uses a subset of the input tensor (e.g., input tensor 510) (or a group of channels from the input tensor 510) to generate an output point 512 (of an output tensor 530), as shown in FIG. 5. Group convolution reduces the number of multiply/accumulates needed to generate a value for the output point 512. Moreover, the size of the weight set (e.g., weight set 520) decreases based on the number of groups. In the illustrated example of FIG. 5, the number of multiply/accumulates to generate a single point in the output tensor is [[kx*ky*ic]/ NUM_GROUPS], where kx*ky*ic represents the size of the input tensor, and NUM_GROUPS represents the number of groups used in the group convolution.

Figure 6:
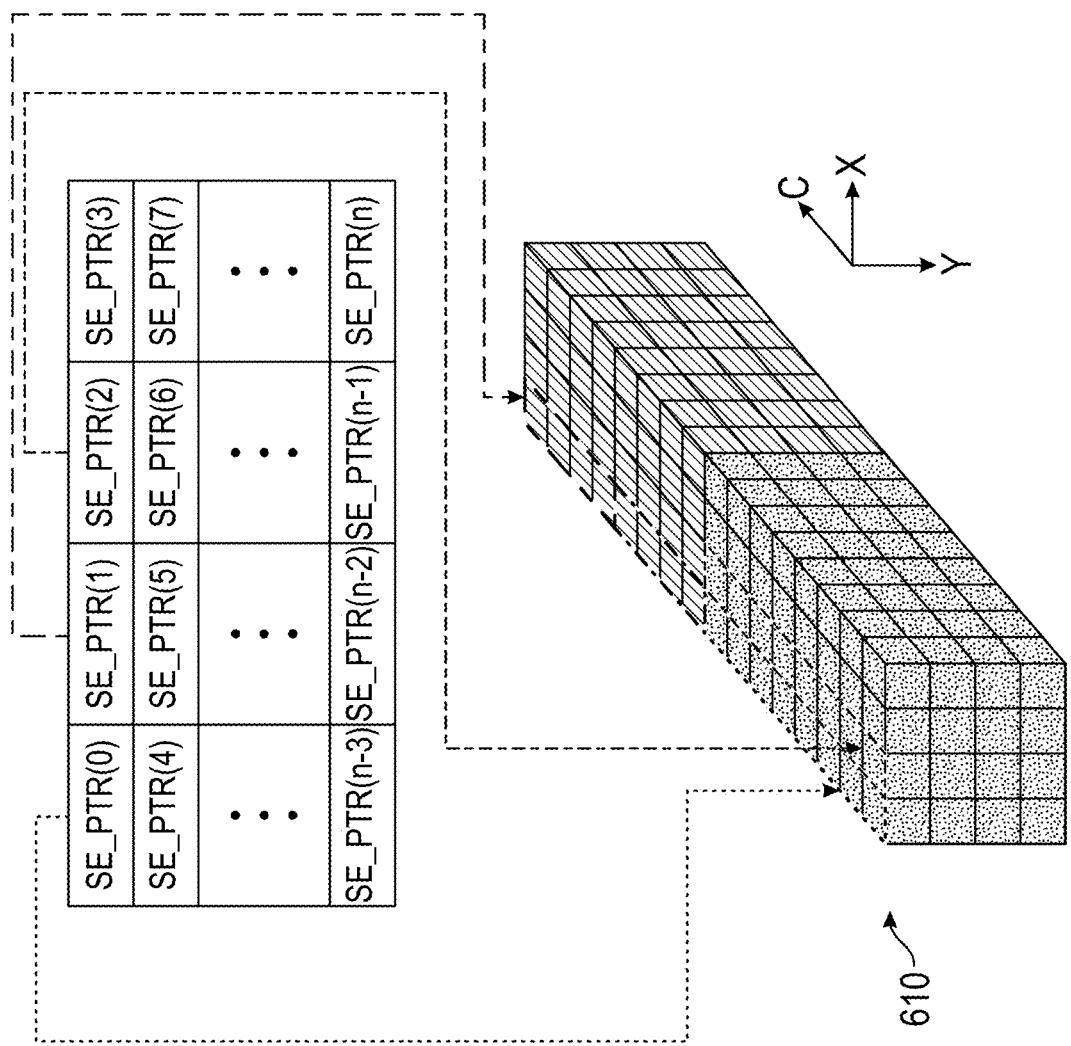
FIG. 6 is a diagram illustrating behavior of a group convolution using storage element pointers.
Figure 6:
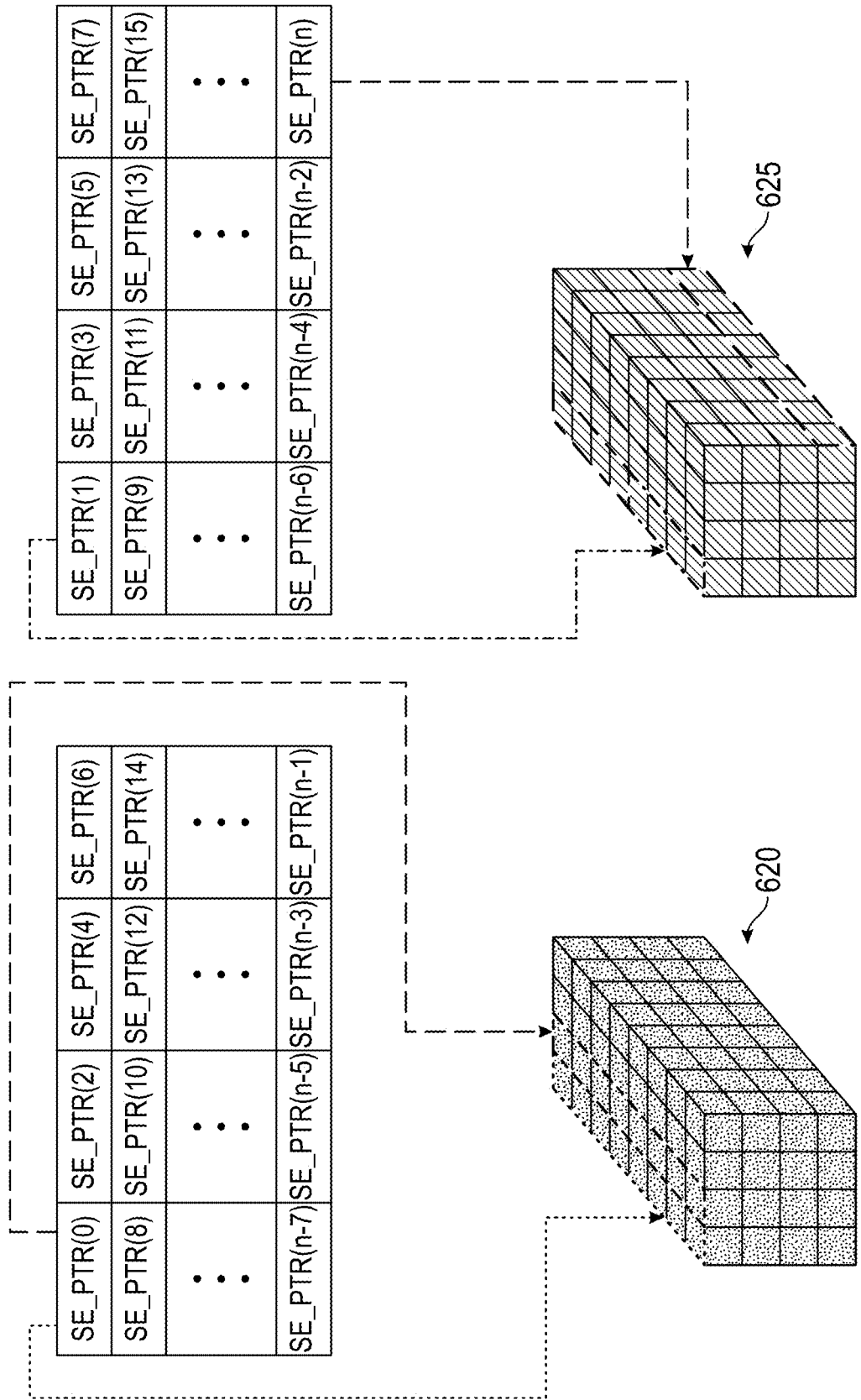

FIG. 6 is a diagram illustrating performance of a group convolution using storage element pointers. As illustrated in FIG. 6, a first tensor 610 with storage elements can be re-arranged into two tensors (e.g., a second tensor 620 and a third tensor 625) by rearranging the pointer table as shown in FIG. 6. Importantly, the values (e.g., activations) in memory do not need to be moved. For example, if the first tensor 610 is contiguous in memory the two "new" tensors 620, 625 are non-contiguous. The storage element pointers thereby allow the neural compute circuitry 115 to operate on non-contiguous data.

Moreover, using storage element pointers enables the neural compute circuitry 115 to process each half of the input tensor as if it were a full tensor. For example, the neural compute circuitry 115 may process the input tensor by reading all the elements in Z before moving onto the next XY location.

Figure 7:
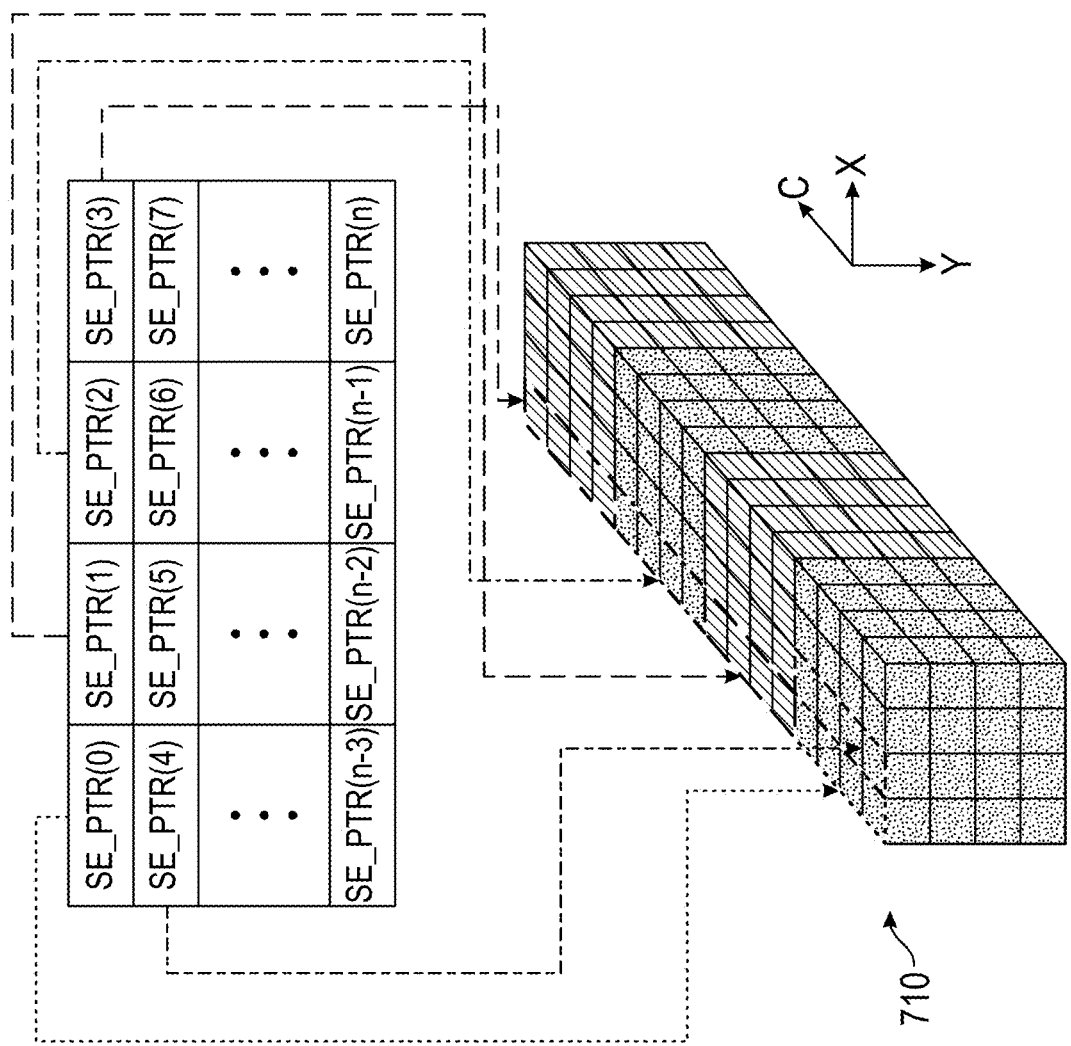
FIG. 7 is a diagram illustrating behavior of a group convolution with channel shuffle using storage element pointers.
Figure 7:
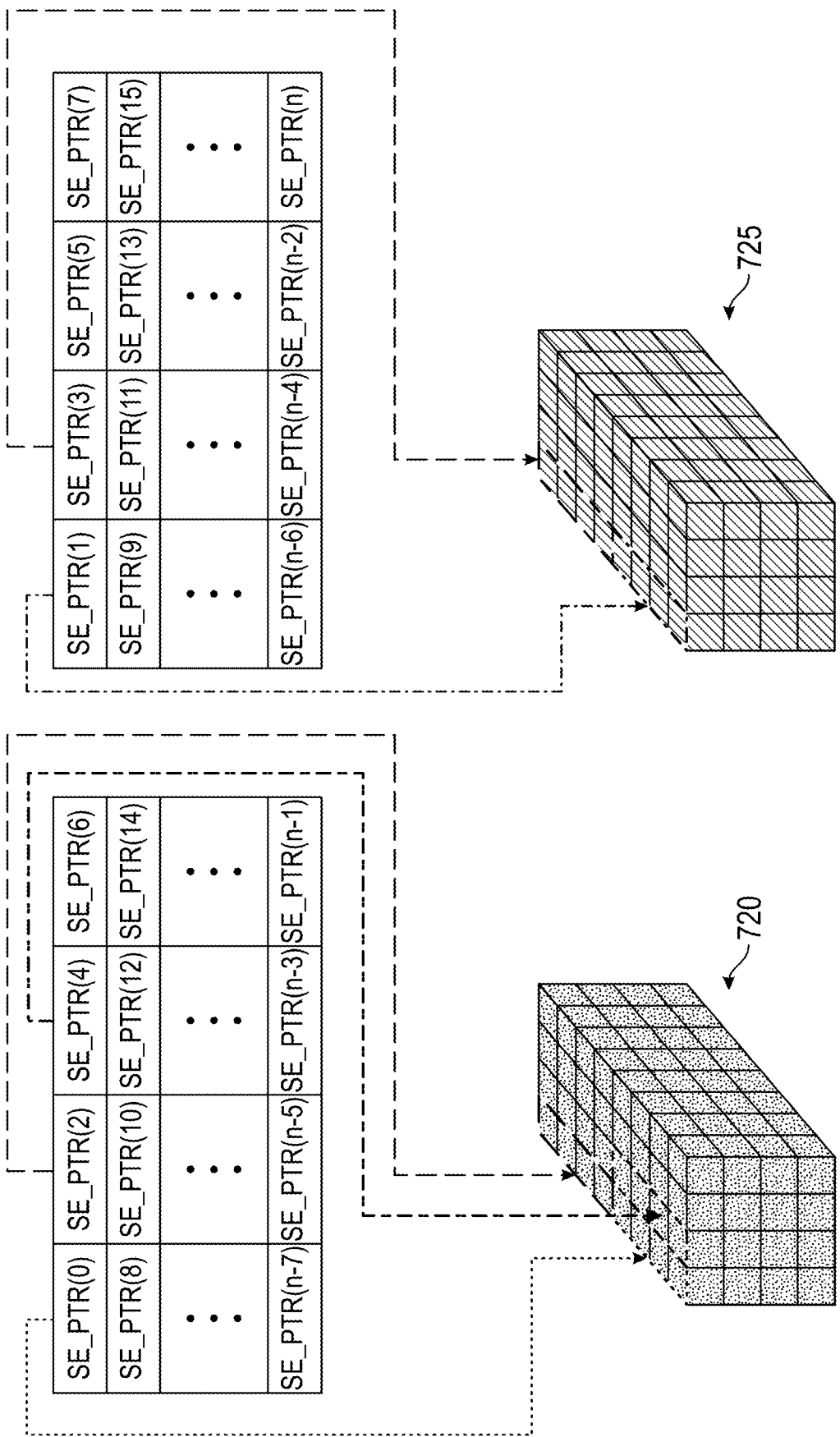

FIG. 7 is a diagram illustrating performance of a group convolution with channel shuffle using storage element pointers. Some machine learning architectures implement a feature called channel shuffle, which allows the channels used in a convolution to be non-contiguous. Using such an approach allows information flow between groups of channels which strengthens representation. As illustrated in FIG. 7, a first tensor 710 with storage elements can be re-arranged into two tensors (e.g., a second tensor 720 and a third tensor 725) by rearranging the pointer table as shown in FIG. 7.

Channel shuffle can be achieved by using additional storage elements per XY location as shown in FIG. 7. In the illustrated example of FIG. 7, a smaller storage element is used to account for the distribution of input channels across the input tensor. Similar to the example of FIG. 6, the storage element pointers can be arranged to individually select the required activation to form two tensors which the neural compute circuitry 115 then performs a standard convolution on. Again, this allows the required activations to appear as contiguous to the neural compute circuitry 115, even though they are distributed (e.g., non-contiguous) in memory.

Although group convolution is described in the examples of FIGS. 4, 5, 6, and/or 7, additional and/or alternative types of convolutions may additionally or alternatively be enabled by way of use of the storage element pointer table including, for example, dilated convolution, which is sometimes also referred to as an atrous convolution. Dilated Convolution allows a filter to span more of the input tensor, without adding extra compute resources by adding a dilation (e.g., additional spacing) between the X/Y coordinates of the tensor. When re-mapping a tensor to allow dilated convolution to be executed as a standard convolution, the input tensor is segmented into a plurality of tensors based on a dilation factor (e.g., a rate defining the additional spacing inserted into the tensor). For a dilation factor of 2, the tensor is split into 4 tensors, for a dilation of 3 the tensor is split into 9 tensors, etc.

Figure 8:
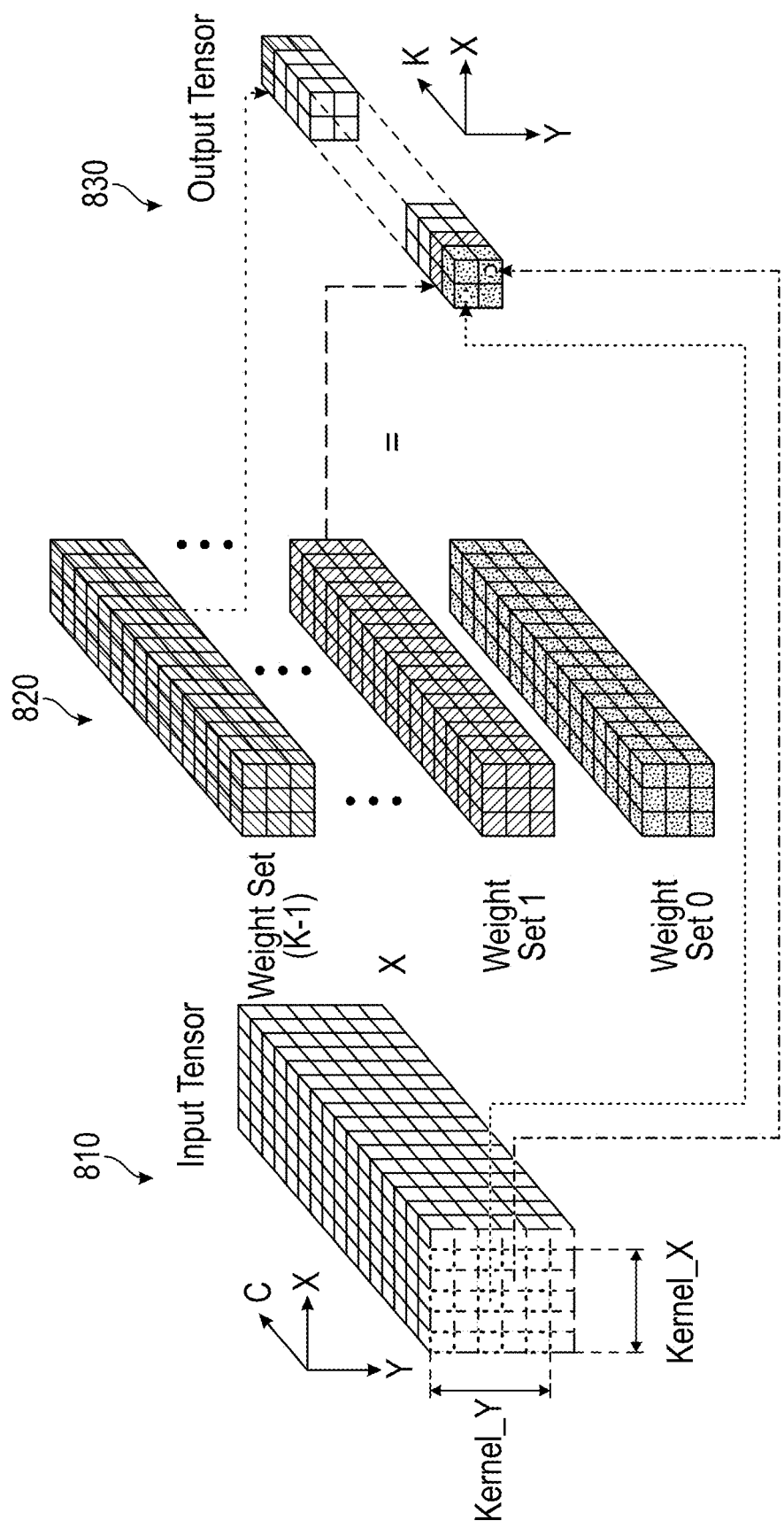
FIG. 8 is a diagram illustrating behavior of a dilated convolution.

FIG. 8 is a diagram illustrating performance of a dilated convolution. The illustrated example of FIG. 8 shows a 3×3 kernel with a dilation of 2, which spans a 5×5 region of an input tensor 810, while employing the same compute as a 3×3 kernel. Using the dilated kernel, weight sets 820 are applied to create an output tensor 830.

Figure 9:
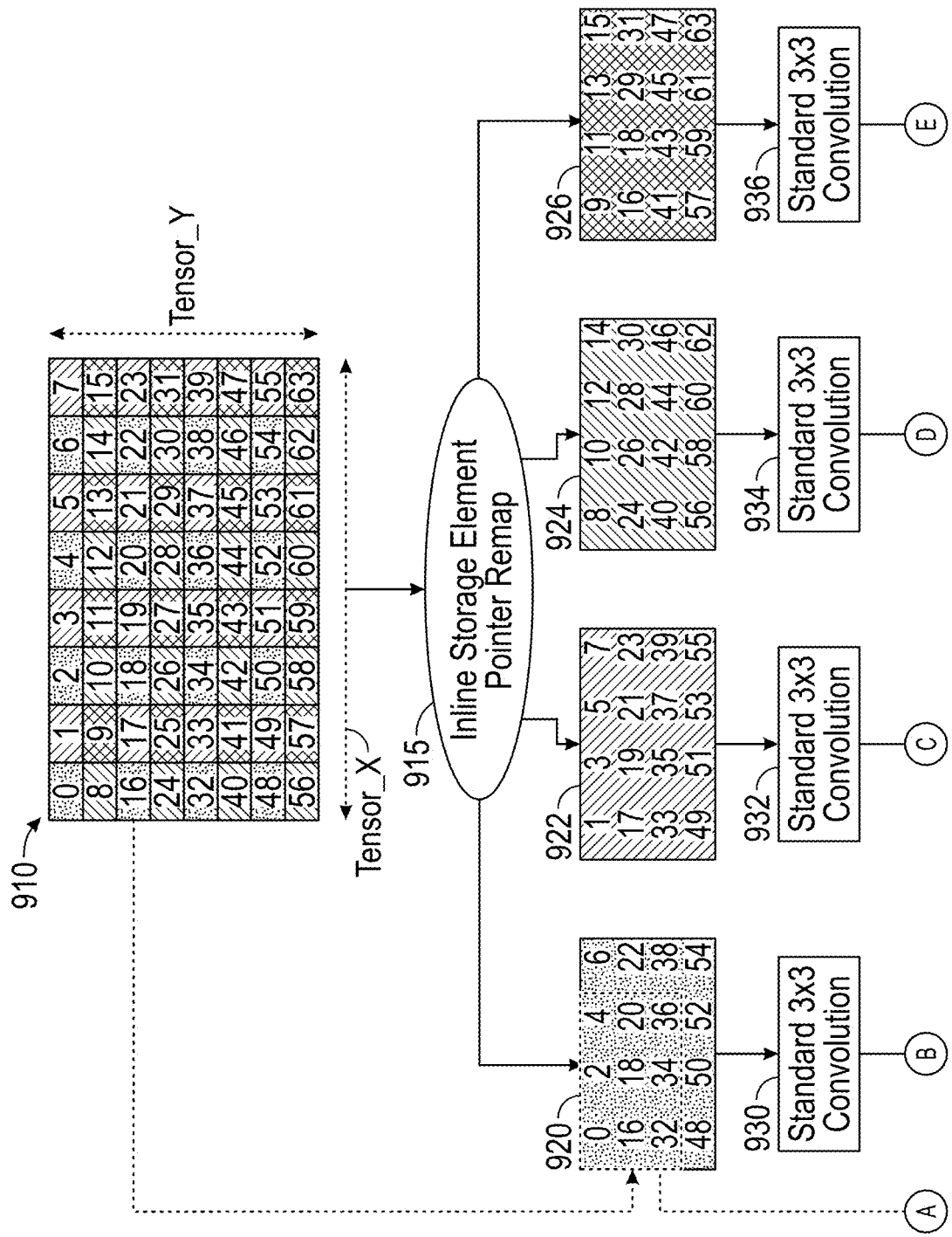
FIGS. 9 and 10 illustrate example approaches to performing a dilated convolution as a standard convolution using Storage Element Pointers.
Figure 9:
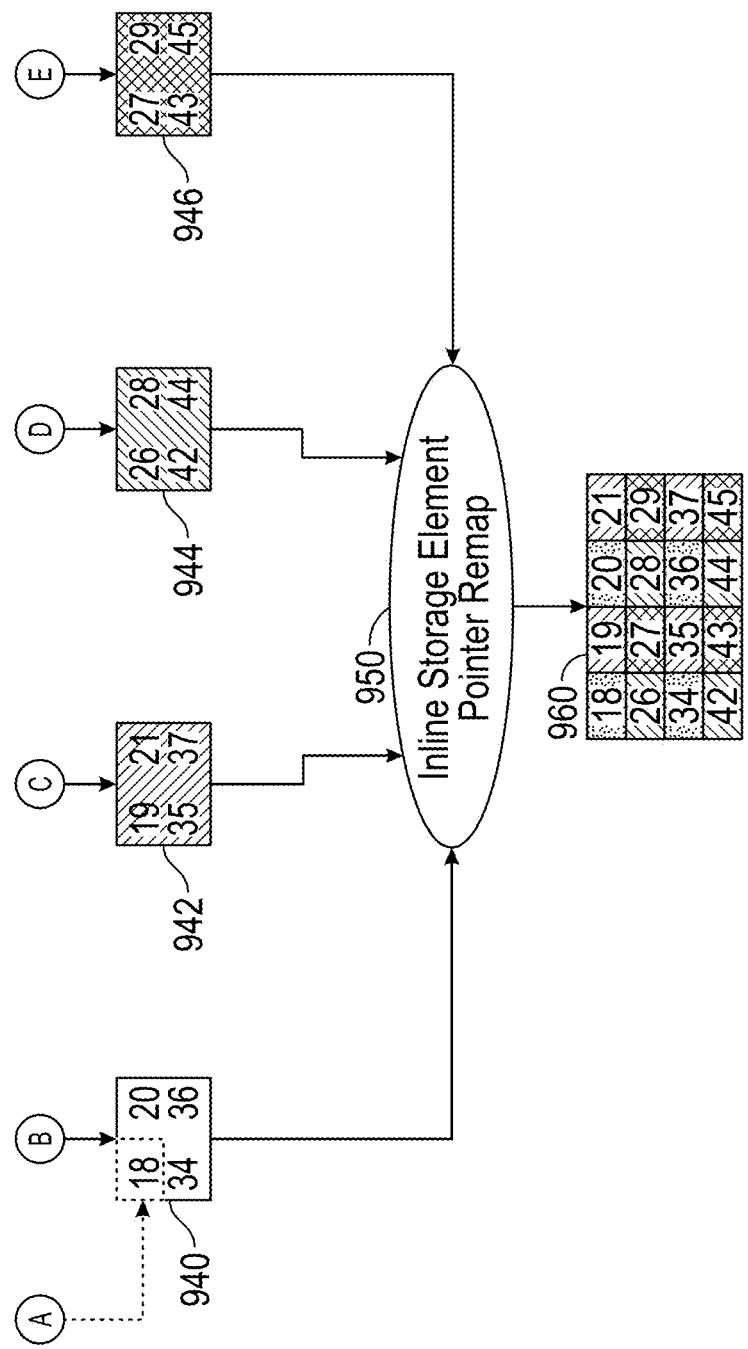
Figure 10:
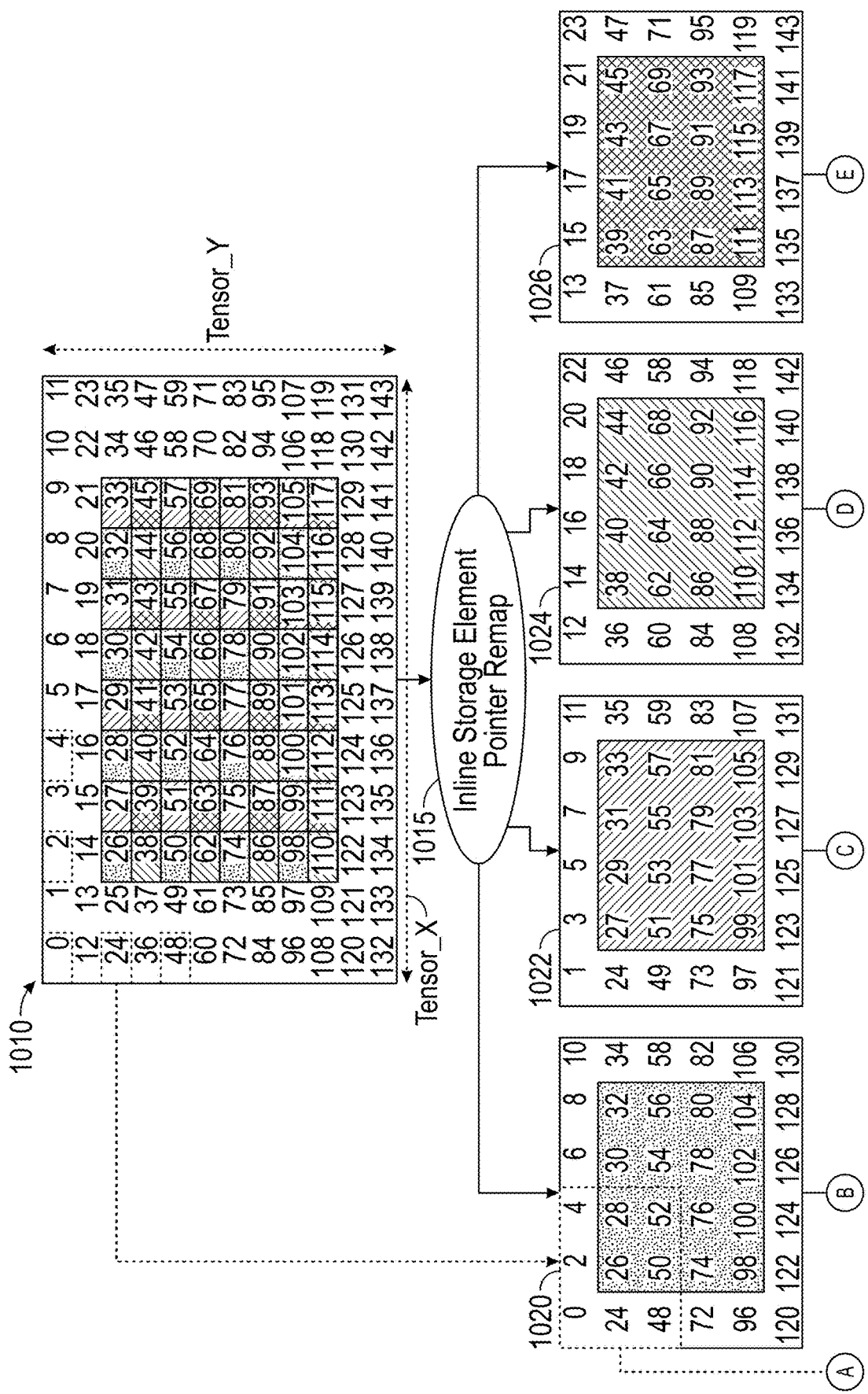
Figure 10:
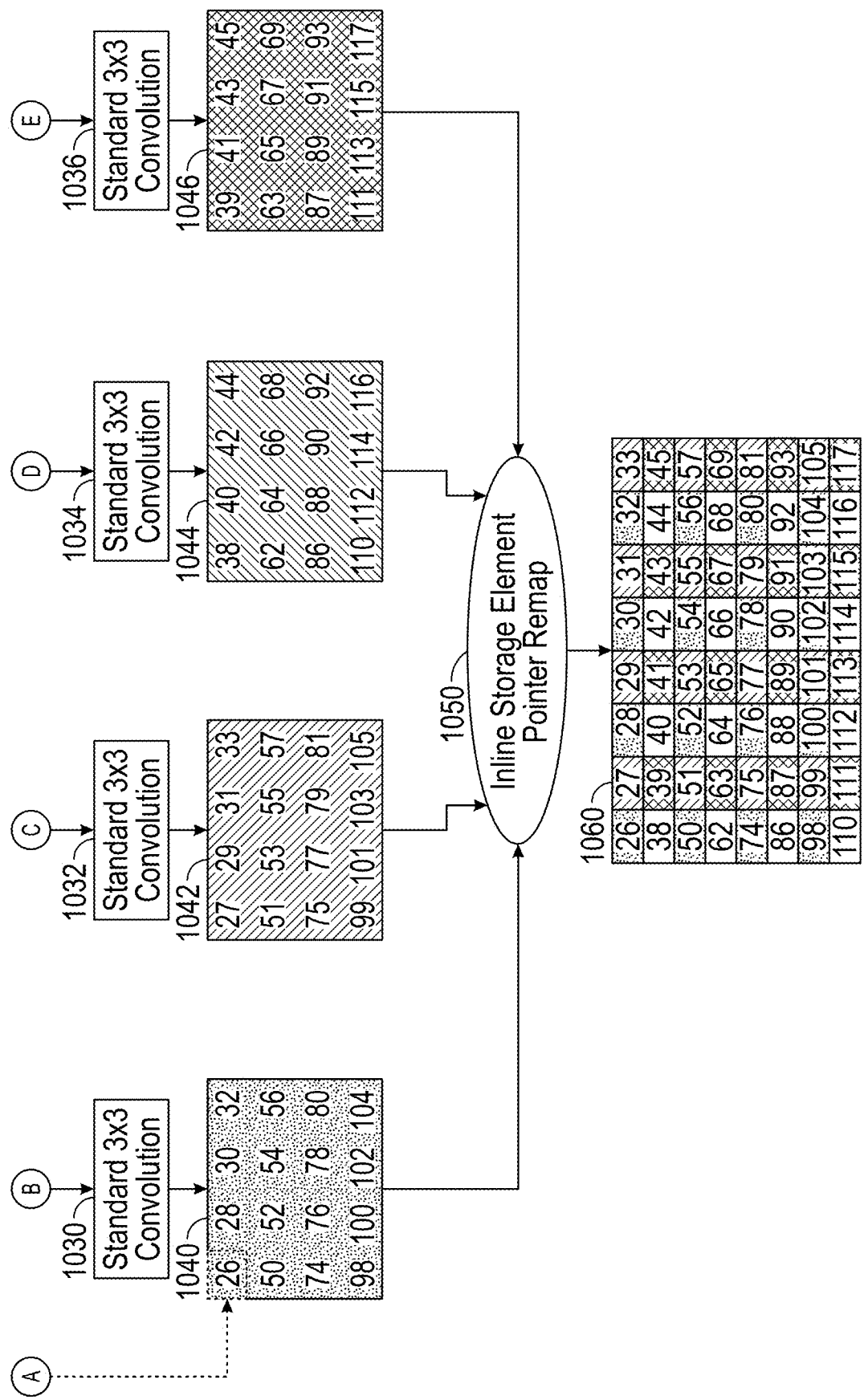

FIGS. 9 and 10 illustrate example approaches to performing a dilated convolution as a standard convolution. In the illustrated examples of FIGS. 9 and 10, a dilation factor of 2 is used. However, any other dilation factor may alternatively be used. In the illustrated example of FIG. 9, using the dilation factor of 2, input tensor data 910 is re-mapped 915 into four separate tensors 920, 922, 924, 926 and standard convolutions 930, 932, 934, 936 are performed on each of the four tensors 920, 922, 924, 926. Of important note, there is no run-time overhead for the re-mapping, as the storage element pointer table is generated at compile time (e.g., prior to a time of receipt of a request to perform a convolution operation). The output from each of the four operations 940, 942, 944, 946 is then re-mapped 950 back into a single tensor using storage element pointers to form an output tensor 960, as shown at the bottom of FIG. 9. Again, this re-mapping is defined at compile time so does not incur a processing penalty at run-time.

FIG. 10, in particular, illustrates the applicability of such an approach to a dilated convolution that uses a padded input tensor (e.g., an input tensor with additional values added about the perimeter of the tensor). In contrast to the illustrated example of FIG. 9, additional padding is added to an input tensor 1010. The padded input tensor data 1010 is re-mapped 1015 into four separate tensors 1020, 1022, 1024, 1026 and standard convolutions 1030, 1032, 1034, 1036 are performed on each of the four tensors 1020, 1022, 1024, 1026. In this example, there is no run-time overhead for the re-mapping, as the storage element pointer table is generated at compile time (e.g., prior to a time of receipt of a request to perform a convolution operation). The output from each of the four operations 1040, 1042, 1044, 1046 is then re-mapped 1050 back into a single tensor using storage element pointers to form an output tensor 1060, as shown at the bottom of FIG. 10. Again, this re-mapping is defined at compile time so does not incur a processing penalty at run-time. The output tensor 1060 of FIG. 10, as a result of the padding of the input tensor 1010, is larger than the output tensor 960 of FIG. 9.

While an example manner of implementing the neural compute circuitry 115 of FIG. 1 is illustrated in FIG. 2, one or more of the elements, processes, and/or devices illustrated in FIG. 2 may be combined, divided, re-arranged, omitted, eliminated, and/or implemented in any other way. Further, the example NoC circuitry 210, the example neural compute orchestration circuitry 220, the DMA circuitry 230, the DPUs 245, 275, the SHAVEs 247, 277, and/or, more generally, the example neural compute circuitry 115 of FIG. 1, may be implemented by hardware alone or by hardware in combination with software and/or firmware. Thus, for example, any of the example NoC circuitry 210, the example neural compute orchestration circuitry 220, the DMA circuitry 230, the DPUs 245, 275, the SHAVEs 247, 277, and/or, more generally, the example neural compute circuitry 115 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example neural compute circuitry 115 of FIG. 1 may include one or more elements, processes, and/or devices in addition to, or instead of, those illustrated in FIG. 2, and/or may include more than one of any or all of the illustrated elements, processes and devices.

Figure 11:
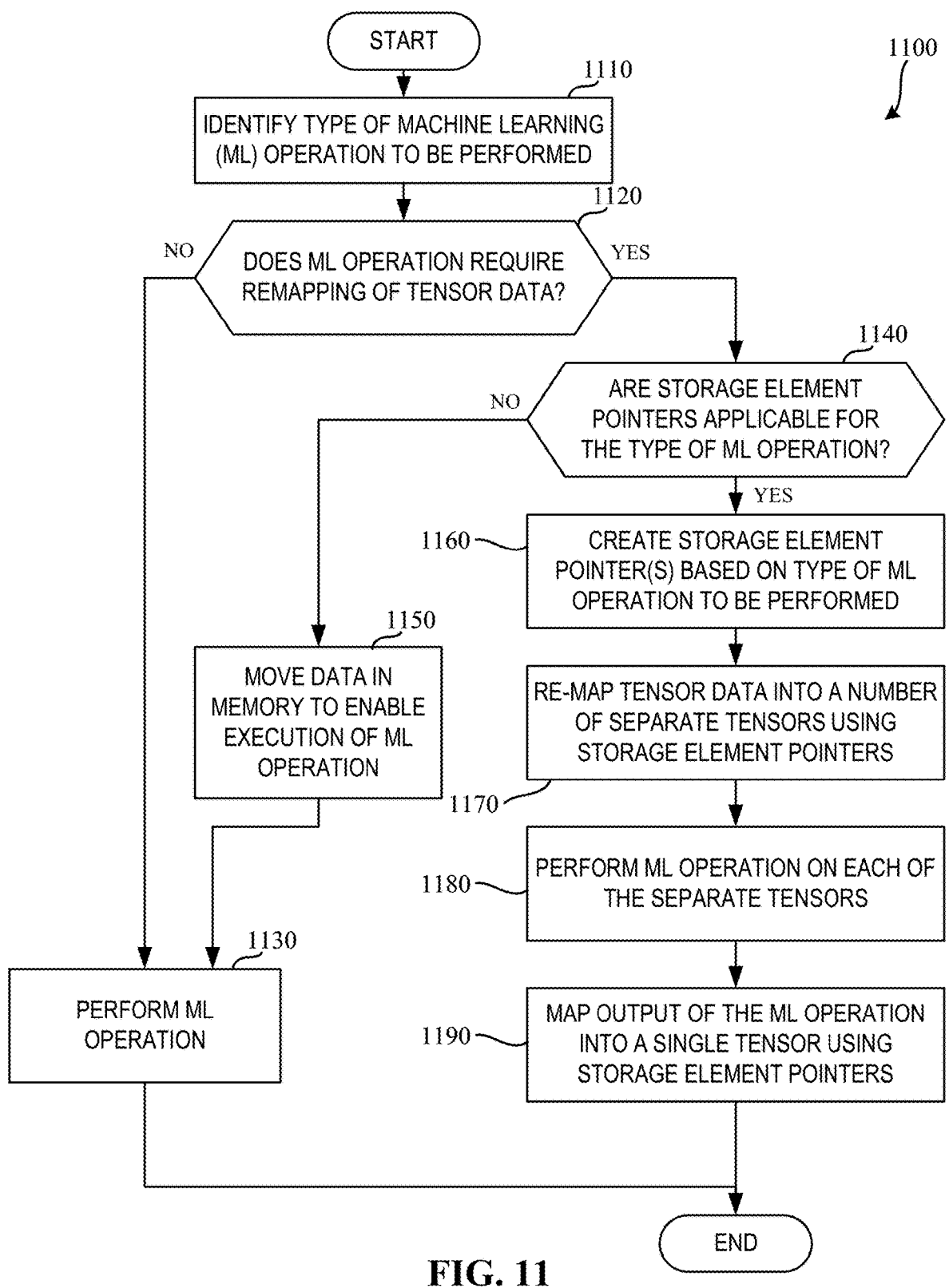
FIG. 11 is a flowchart representative of example machine readable instructions and/or example operations that may be executed and/or instantiated by processor circuitry to perform a machine learning operation using storage element pointers.

A flowchart representative of example hardware logic circuitry, machine readable instructions, hardware implemented state machines, and/or any combination thereof for implementing the neural compute circuitry 115 of FIG. 1 is shown in FIG. 11. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray™ disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 11, many other methods of implementing the example neural compute circuitry 115 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java™, C#, Perl™, Python™, JavaScrip™, HyperText Markup Language (HTML), Structured Query Language (SQL), Swift™, etc.

As mentioned above, the example operations of FIG. 11 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 11 is a flowchart representative of example machine readable instructions and/or example operations 1100 that may be executed and/or instantiated by processor circuitry to perform a machine learning operation using storage element pointers. The machine readable instructions and/or the operations 1100 of FIG. 11 begin in response to a request to perform a machine learning operation on tensor data. At block 1110, the neural compute orchestration circuitry 220 identifies a type of machine learning operation to be performed based on the request received via the NoC circuitry 210. (Block 1110). The example NoC circuitry 210 provides the tensor data that is to be operated upon to the CMX memory 240.

In some examples, the requested machine learning operation may require utilize remapping of tensor data. For example, group convolution and dilated convolution operations might utilize remapping of tensor data, whereas a standard convolution operation might not utilize such remapping. The neural compute orchestration circuitry 220 determines whether the requested machine learning operation requires remapping of tensor data. (Block 1120). In examples disclosed herein, the determination of whether the machine learning operation requires remapping of tensor data is based on the type of machine learning operation to be performed. For example, group convolution and dilated convolution operations may be identified as types of machine learning operations that require remapping of tensor data. However, any other type of machine learning operation that utilizes remapping of data may additionally or alternatively be used.

If no remapping of data is needed (e.g., block 1120 returns a result of NO), the neural compute orchestration circuitry 220 causes one or more of the DPUs 245, 275 or SHAVEs 247, 277 to perform the machine learning operation on the data stored in the CMX memory 241 and/or 271. (Block 1130). The result of the machine learning operation is then provided to the requestor by the NoC circuitry 210.

If remapping of data is required for performance of the machine learning operation (e.g., block 1120 returns a result of YES), the neural compute orchestration circuitry 220 determines whether storage element pointers are applicable for the type of machine learning operation. (Block 1140). In some examples, even though the type of operation might be able to use storage element pointers, such use of storage element pointers might not be applicable. For example, if the data is to be moved at a granularity of less than a threshold number of bytes (e.g., sixteen bytes), the storage element pointers might not be able to be manipulated. In some examples, the tensor transformation is not known at compile time and, as a result, the use of storage element pointers might not be applicable. The example neural compute orchestration circuitry 220 creates the storage element pointer table based on the operation being performed, and loads the storage element pointer table into the CMX memory makes such a determination by consulting, for example, the direct memory access circuitry 230 to see if such storage element pointers are available in the storage element pointer table 242. If usage of storage element pointers is not applicable (e.g., block 1140 returns a result of NO), the tensor is re-mapped in memory by the direct memory access circuitry 230. (Block 1150). That is, the elements of the input data are manipulated to put the tensor data into a format such that the machine learning operation can be performed. As described above, manipulating the tensor data (e.g., moving tensor data from one location to another) is computationally expensive from both a compute and memory resource perspective.

If remapping of data is required (e.g., block 1120 returns a result of YES) and the use of storage element pointers is applicable for the type of machine learning operation (e.g., block 1140 returns a result of YES), the example neural compute orchestration circuitry 220 creates the storage element pointers and writes the table to the CMX 241 via the DMA circuitry 230. (Block 1160). Using the storage element pointers, the tensor data can be remapped into a number of separate tensors. (Block 1170). The neural compute orchestration circuitry 220 causes one or more of the DPUs 250, 260 or SHAVEs 255, 265 to perform the machine learning operation on the data stored in the CMX memory 240 and based on the storage element pointers. (Block 1180). In particular, the execution of the machine learning operation on the data stored in the CMX memory 240 is performed without movement of the data in memory. After execution of the machine learning operation, the output is mapped into a single output tensor using storage element pointers stored in the storage element pointer table 242. (Block 1190). The NoC circuitry 210 can then provide the output tensor to the requestor. The process of FIG. 11 then terminates, but may be re-executed upon, for example, receipt of a subsequent request to perform a machine learning operation.

Figure 12:
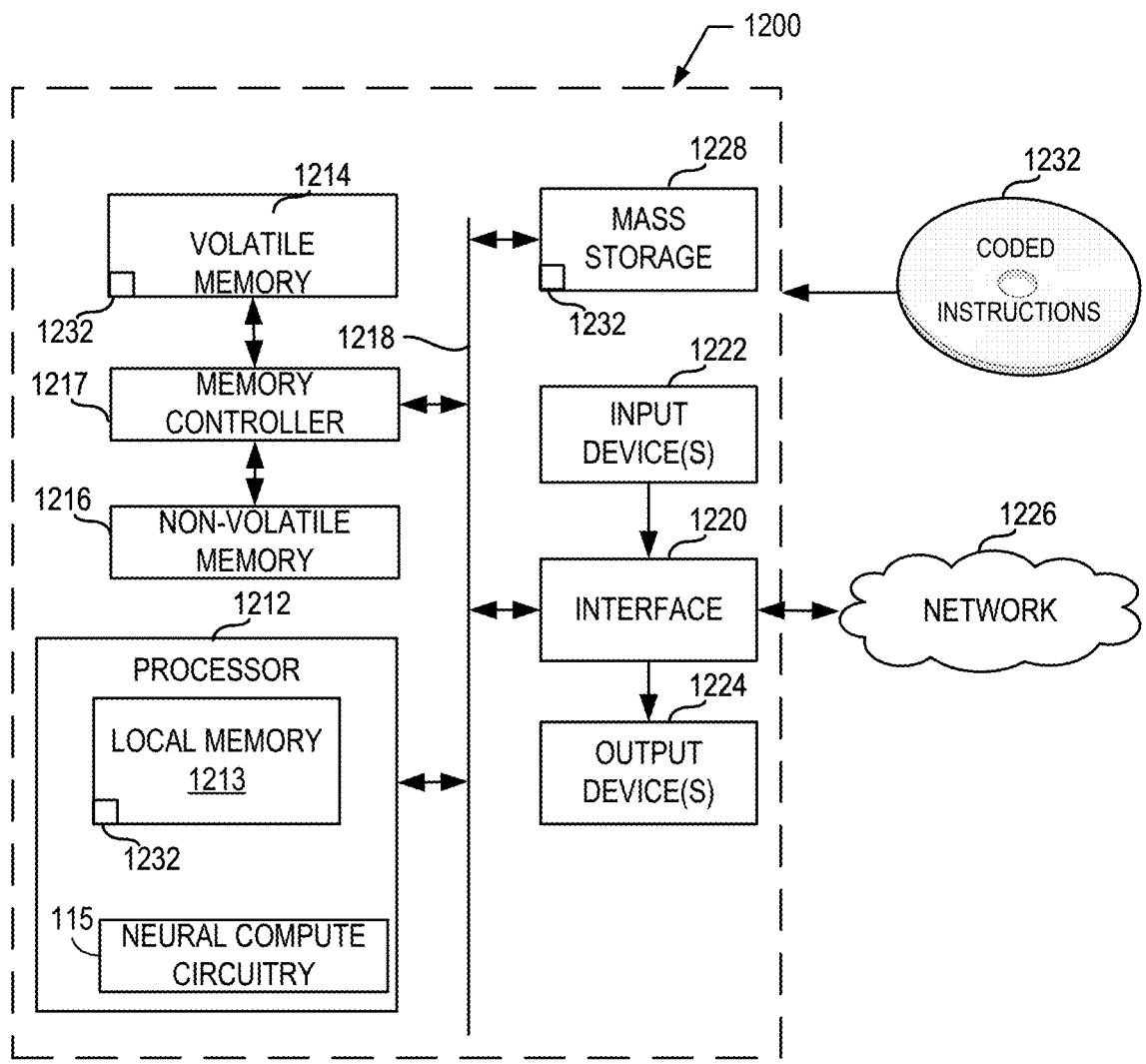
FIG. 12 is a block diagram of an example processing platform including processor circuitry structured to execute the example machine readable instructions and/or the example operations of FIG. 11 to implement the neural compute circuitry of FIG. 2.

FIG. 12 is a block diagram of an example processor platform 1200 structured to execute and/or instantiate the machine readable instructions and/or the operations of FIG. 11 to implement the compute node 100 of FIG. 1A. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray™ player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the example neural compute circuitry 115. However, in some examples, the neural compute circuitry 115 may be implemented separately from the processor circuitry 1212.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray™ disk drives, redundant array of independent disks (RAID) systems, solid state storage devices such as flash memory devices and/or SSDs, and DVD drives.

The machine executable instructions 1232, which may be implemented by the machine readable instructions of FIG. 11, may be stored in the mass storage device 1228, in the volatile memory 1214, in the non-volatile memory 1216, and/or on a removable non-transitory computer readable storage medium such as a CD or DVD.

Figure 13:
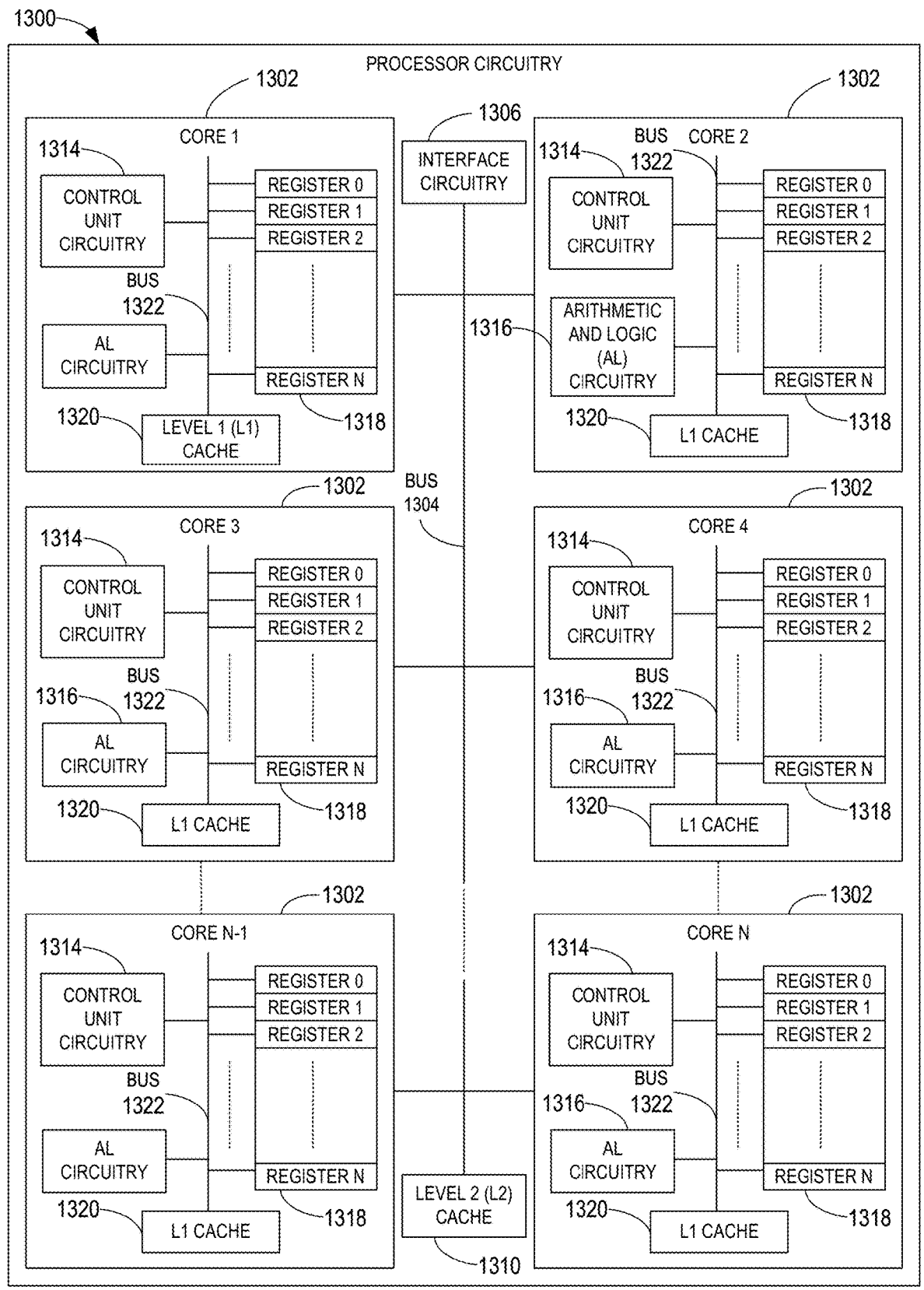
FIG. 13 is a block diagram of an example implementation of the processor circuitry of FIG. 12.

FIG. 13 is a block diagram of an example implementation of the processor circuitry 1212 of FIG. 12. In this example, the processor circuitry 1212 of FIG. 12 is implemented by a general purpose microprocessor 1300. The general purpose microprocessor circuitry 1300 executes some or all of the machine readable instructions of the flowchart of FIG. 11 to effectively instantiate the circuitry of FIG. 2 as logic circuits to perform the operations corresponding to those machine readable instructions. In some such examples, the circuitry of FIG. 2 is instantiated by the hardware circuits of the microprocessor 1300 in combination with the instructions. For example, the microprocessor 1300 may implement multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowchart of FIG. 11.

The cores 1302 may communicate by a first example bus 1304. In some examples, the first bus 1304 may implement a communication bus to effectuate communication associated with one(s) of the cores 1302. For example, the first bus 1304 may implement at least one of an Inter-Integrated Circuit (I2C) bus, a Serial Peripheral Interface (SPI) bus, a PCI bus, or a PCIe bus. Additionally or alternatively, the first bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2_cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the L1 cache 1320, and a second example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The second bus 1322 may implement at least one of an I2C bus, a SPI bus, a PCI bus, or a PCIe bus.

Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
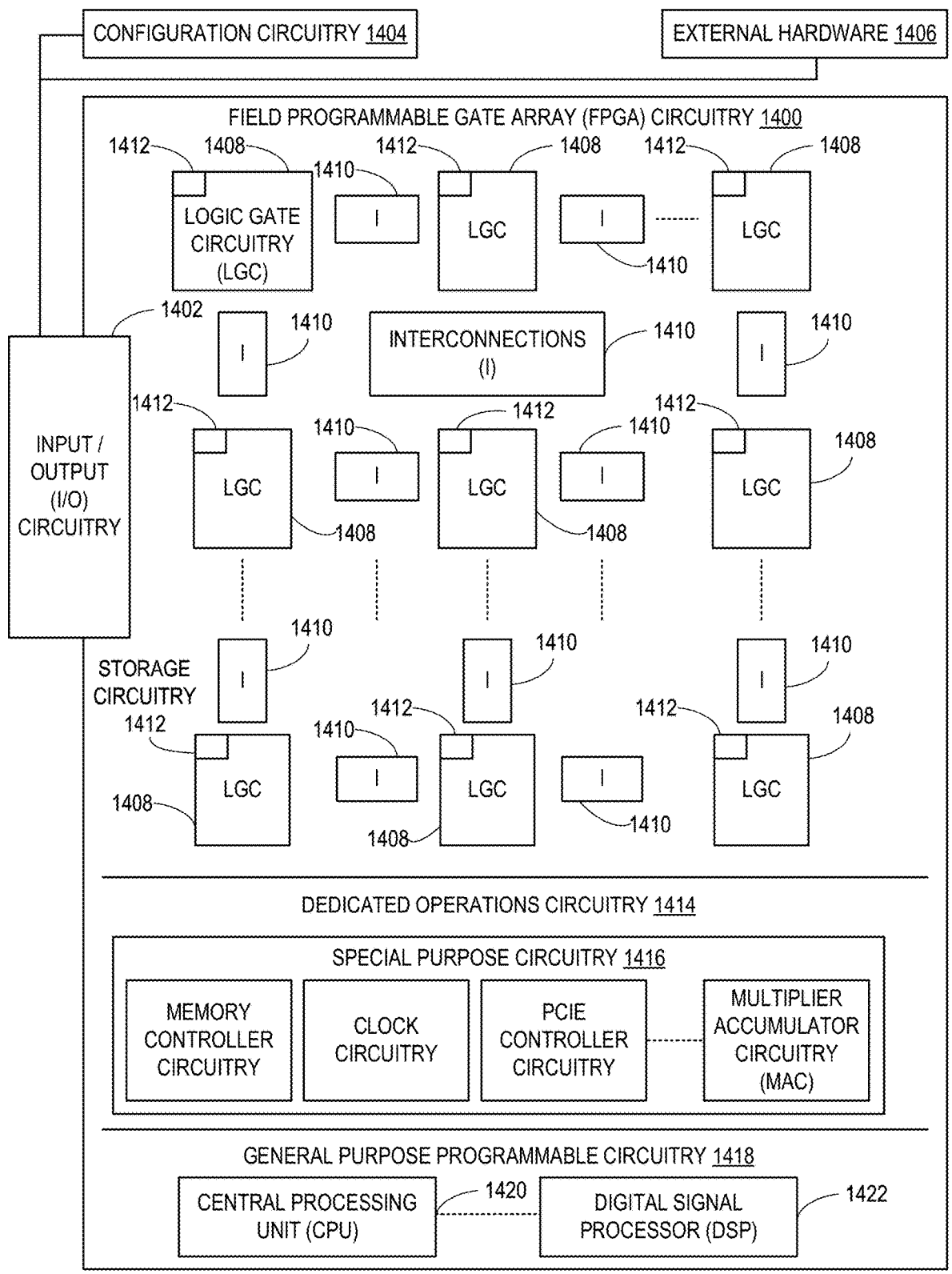
FIG. 14 is a block diagram of another example implementation of the processor circuitry of FIG. 12.

FIG. 14 is a block diagram of another example implementation of the processor circuitry 1212 of FIG. 12. In this example, the processor circuitry 1212 is implemented by FPGA circuitry 1400. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowchart of FIG. 11 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowchart of FIG. 11. In particular, the FPGA 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowchart of FIG. 11. As such, the FPGA circuitry 1400 may be structured to effectively instantiate some or all of the machine readable instructions of the flowchart of FIG. 11 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIG. 11 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware (e.g., external hardware circuitry) 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may implement the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and interconnections 1410 are configurable to instantiate one or more operations that may correspond to at least some of the machine readable instructions of FIG. 11 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modern FPGA circuitry may include an onboard CPU, such as one or more of the example CPU 1420 of FIG. 14. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowchart of FIG. 11 may be executed by one or more of the cores 1302 of FIG. 13, a second portion of the machine readable instructions represented by the flowchart of FIG. 11 may be executed by the FPGA circuitry 1400 of FIG. 14, and/or a third portion of the machine readable instructions represented by the flowchart of FIG. 11 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1212 of FIG. 12 may be in one or more packages. For example, the processor circuitry 1300 of FIG. 13 and/or the FPGA circuitry 1400 of FIG. 14 may be in one or more packages. In some examples, an XPU may be implemented by the processor circuitry 1212 of FIG. 12, which may be in one or more packages. For example, the XPU may include a CPU in one package, a DSP in another package, a GPU in yet another package, and an FPGA in still yet another package.

Figure 15:
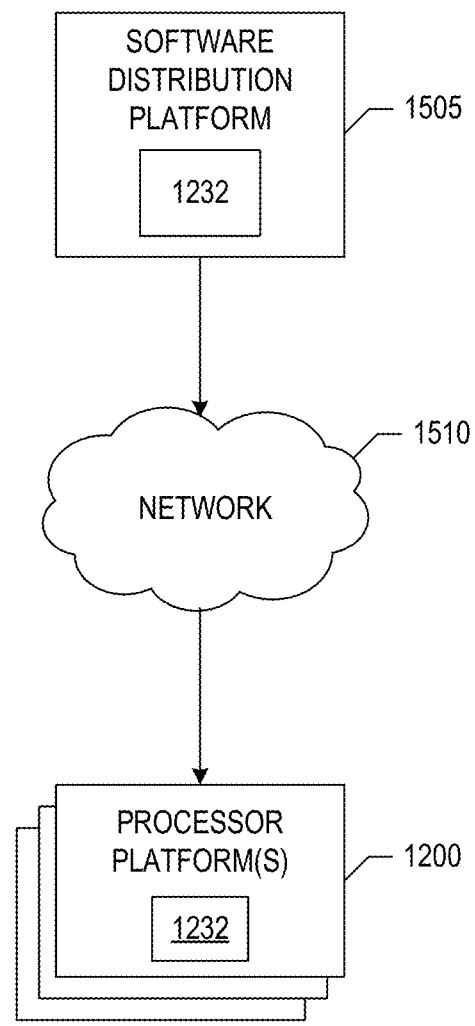
FIG. 15 is a block diagram of an example software distribution platform (e.g., one or more servers) to distribute software (e.g., software corresponding to the example machine readable instructions of FIG. 11) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 1232 of FIG. 12 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1232, which may correspond to the example machine readable instructions 11 of FIG. 11, as described above. The one or more servers of the example software distribution platform 1505 are in communication with a network 1510, which may correspond to any one or more of the Internet and/or any of the example networks 1226 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232 from the software distribution platform 1505. For example, the software, which may correspond to the example machine readable instructions 1232 of FIG. 12, may be downloaded to the example processor platform 1200, which is to execute the machine readable instructions 1232 to implement the neural compute circuitry 115. In some example, one or more servers of the software distribution platform 1505 periodically offer, transmit, and/or force updates to the software (e.g., the example machine readable instructions 1232 of FIG. 12) to ensure improvements, patches, updates, etc., are distributed and applied to the software at the end user devices.

From the foregoing, it will be appreciated that example systems, methods, apparatus, and articles of manufacture have been disclosed that enable performance of machine learning operations using storage element pointers. Disclosed systems, methods, apparatus, and articles of manufacture improve the efficiency of a compute device by the use of such storage element pointers, by avoiding overhead operations of traditional approaches for execution of machine learning operations such as moving and/or re-arranging input tensors and/or intermediate tensors in memory. In this manner, the use of such storage element pointers enables execution of such machine learning operations without incurring the cost of such re-arrangement in terms of processing time and/or energy usage (e.g., reducing memory accesses). Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for performing a machine learning operation using storage element pointers are disclosed herein. Further examples and combinations thereof include the following:

Example 1 includes an apparatus for performing a machine learning operation comprising interface circuitry to obtain an input tensor upon which a machine learning operation is to be performed, the interface circuitry to output an output tensor, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate neural compute orchestration circuitry to in response to a determination that a machine learning operation is to be performed, create first and second storage element pointers based on a type of machine learning operation to be performed, remap input tensor data of the input tensor based on the first storage element pointer without modification of the input tensor data in memory, cause execution of the machine learning operation with the remapped input tensor data to create intermediate tensor data, remap the intermediate tensor data based on the second storage element pointer without modification of the intermediate tensor data in memory, and provide the remapped intermediate tensor data to the interface circuitry as the output tensor.

Example 2 includes the apparatus of example 1, wherein the machine learning operation is a convolution operation.

Example 3 includes the apparatus of example 2, wherein the convolution operation is a group convolution operation.

Example 4 includes the apparatus of example 2, wherein the convolution operation is a dilated convolution operation.

Example 5 includes the apparatus of example 1, wherein the neural compute orchestration circuitry is further to, in response to a determination that the first and second storage element pointers are not applicable, modify the input tensor data in memory.

Example 6 includes the apparatus of example 1, wherein the neural compute orchestration circuitry is further to remap the input tensor data without modifying the input tensor data in memory in an inline fashion.

Example 7 includes at least one non-transitory computer readable medium comprising instructions that, when executed, cause at least one processor to at least create, in response to a determination that a machine learning operation is to be performed, first and second storage element pointers based on a type of machine learning operation to be performed, remap input tensor data of the input tensor based on the first storage element pointer without movement of the input tensor data in memory, cause execution of the machine learning operation with the remapped input tensor data to create intermediate tensor data, remap the intermediate tensor data based on the second storage element pointer without movement of the intermediate tensor data in memory, and provide the remapped intermediate tensor data as an output tensor.

Example 8 includes the at least one non-transitory computer readable medium of example 7, wherein the machine learning operation is a convolution operation.

Example 9 includes the at least one non-transitory computer readable medium of example 8, wherein the convolution operation is a group convolution operation.

Example 10 includes the at least one non-transitory computer readable medium of example 8, wherein the convolution operation is a dilated convolution operation.

Example 11 includes the at least one non-transitory computer readable medium of example 7, wherein the instructions, when executed, cause the at least one processor to, in response to determining that the first and second storage element pointers are applicable, move the input tensor data in memory.

Example 12 includes the at least one non-transitory computer readable medium of example 7, wherein the remapping of the input tensor data without modifying the input tensor data in memory is performed inline.

Example 13 includes a method for performing a machine learning operation, the method comprising in response to a determination that a machine learning operation is to be performed, creating first and second storage element pointers based on a type of machine learning operation to be performed, using the first storage element pointer to remap input tensor data without modifying the input tensor data in memory, causing execution of the machine learning operation on the remapped input tensor data to create intermediate tensor data, using the second storage element pointer to remap the intermediate tensor data without modifying the intermediate tensor data in memory, and providing the remapped intermediate tensor data as an output tensor.

Example 14 includes the method of example 13, wherein the machine learning operation is a convolution operation.

Example 15 includes the method of example 14, wherein the convolution operation is a group convolution operation.

Example 16 includes the method of example 14, wherein the convolution operation is a dilated convolution operation.

Example 17 includes the method of example 13, further including, in response to determining that the first and second storage element pointers are not applicable, moving the input tensor data in memory.

Example 18 includes the method of example 13, wherein the remapping of the input tensor data without modifying the input tensor data in memory is performed inline.

Example 19 includes an apparatus for performing a machine learning operation, the apparatus comprising means for orchestrating to create, in response to a determination that a machine learning operation to be performed is to use remapped tensor data, first and second storage element pointers based on a type of machine learning operation to be performed, means for re-mapping input tensor data without modifying the input tensor data in memory based on the first storage element pointer, wherein the means for orchestrating is to cause execution of the machine learning operation on the remapped input tensor data to create intermediate tensor data, wherein the means for re-mapping is to remap the intermediate tensor data based on the second storage element pointer without modifying the intermediate tensor data in memory, and means for outputting the remapped intermediate tensor data as an output tensor.

Example 20 includes the apparatus of example 19, wherein the machine learning operation is a convolution operation.

Example 21 includes the apparatus of example 20, wherein the convolution operation is a group convolution operation.

Example 22 includes the apparatus of example 20, wherein the convolution operation is a dilated convolution operation.

Example 23 includes the apparatus of example 19, wherein the means for orchestrating is to, in response to determining that the first and second storage element pointers are not applicable, cause movement of the input tensor data in memory.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus, comprising:
a computer processor; and a non-transitory computer-readable memory storing computer program instructions executable by the computer processor to perform operations, the operations comprising:
generating a first pointer table for a machine learning operation of a first type, the first pointer table comprising storage element pointers pointing to storage elements of a memory, wherein a storage element is to store a particular portion of an input tensor of the machine learning operation of the first type;
generating a second pointer table by rearranging one or more storage element pointers in the first pointer table;
forming a first tensor based on the second pointer table, the first tensor comprising a data element of the input tensor, wherein a position of the data element in the first tensor is different form a position of the data element in the input tensor;
causing execution of a machine learning operation of a second type with the first tensor to generate a second tensor;
generating a third pointer group, the third pointer group comprising storage element pointers pointing to storage elements storing data elements of the second tensor; and
forming an output tensor of the machine learning operation of the first type from the second tensor based on the third pointer group.

2. The apparatus of claim 1, wherein the machine learning operation of the first type is a convolution operation.

3. The apparatus of claim 2, wherein the convolution operation of the second type is a group convolution operation.

4. The apparatus of claim 2, wherein the convolution operation of the second type is a dilated convolution operation.

5. The apparatus of claim 1, wherein the first tensor further comprises an additional data element of the input tensor, wherein the data element and the additional data element are adjacent in the first tensor, wherein the data element and the additional data element are separated by one or more other data elements in the input tensor.

6. The apparatus of claim 1, wherein the second pointer table comprises a subset of the storage element pointers of the first pointer table.

7. The apparatus of claim 1, wherein the particular portion of the input tensor comprises activations in a plurality of input channels of the machine learning operation of the first type.

8. At least one non-transitory computer readable medium storing instructions that, when executed, cause at least one processor to perform operations, the operations comprising:
generating a first pointer table for a machine learning operation of a first type, the first pointer table comprising storage element pointers pointing to storage elements of a memory, wherein a storage element is to store a particular portion of an input tensor of the machine learning operation of the first type;
generating a second pointer table by rearranging one or more storage element pointers in the first pointer table;
forming a first tensor based on the second pointer table, the first tensor comprising a data element of the input tensor, wherein a position of the data element in the first tensor is different form a position of the data element in the input tensor;
causing execution of a machine learning operation of a second type with the first tensor to generate a second tensor;
generating a third pointer group, the third pointer group comprising storage element pointers pointing to storage elements storing data elements of the second tensor; and
forming an output tensor of the machine learning operation of the first type from the second tensor based on the third pointer group.

9. The at least one non-transitory computer readable medium of claim 8, wherein the machine learning operation of the first type is a convolution operation.

10. The at least one non-transitory computer readable medium of claim 9, wherein the convolution operation of the second type is a group convolution operation.

11. The at least one non-transitory computer readable medium of claim 9, wherein the convolution operation of the second type is a dilated convolution operation.

12. The at least one non-transitory computer readable medium of claim 8, wherein the generating of the first pointer table, the second pointer table, or the third pointer table is performed before the execution of the machine learning operation of the second type.

13. The at least one non-transitory computer readable medium of claim 8, wherein the first tensor further comprises an additional data element of the input tensor, wherein the data element and the additional data element are adjacent in the first tensor, wherein the data element and the additional data element are separated by one or more other data elements in the input tensor.

14. The at least one non-transitory computer readable medium of claim 8, wherein the second pointer table comprises a subset of the storage element pointers of the first pointer table.

15. The at least one non-transitory computer readable medium of claim 8, wherein the particular portion of the input tensor comprises activations in a plurality of input channels of the machine learning operation of the first type.

16. A method, comprising:
generating a first pointer table for a machine learning operation of a first type, the first pointer table comprising storage element pointers pointing to storage elements of a memory, wherein a storage element is to store a particular portion of an input tensor of the machine learning operation of the first type;
generating a second pointer table by rearranging one or more storage element pointers in the first pointer table;
forming a first tensor based on the second pointer table, the first tensor comprising a data element of the input tensor, wherein a position of the data element in the first tensor is different form a position of the data element in the input tensor;
causing execution of a machine learning operation of a second type on the first tensor to generate a second tensor;
generating a third pointer group, the third pointer group comprising storage element pointers pointing to storage elements storing data elements of the second tensor; and forming an output tensor of the machine learning operation of the first type from the second tensor based on the third pointer group.

17. The method of claim 16, wherein the machine learning operation of the first type is a convolution operation.

18. The method of claim 17, wherein the convolution operation of the second type is a group convolution operation.

19. The method of claim 17, wherein the convolution operation of the second type is a dilated convolution operation.

20. The method of claim 16, wherein the generating of the first pointer table, the second pointer table, or the third pointer table is performed before the execution of the machine learning operation of the second type.

21. The method of claim 16, wherein the first tensor further comprises an additional data element of the input tensor, wherein the data element and the additional data element are adjacent in the first tensor, wherein the data element and the additional data element are separated by one or more other data elements in the input tensor.

22. The method of claim 16, wherein the second pointer table comprises a subset of the storage element pointers of the first pointer table.

23. The method of claim 16, wherein the particular portion of the input tensor comprises activations in a plurality of input channels of the machine learning operation of the first type.

* * * * *